United States Patent [19]

Mankovitz

[11] Patent Number: 5,734,786
[45] Date of Patent: *Mar. 31, 1998

[54] APPARATUS AND METHODS FOR DERIVING A TELEVISION GUIDE FROM AUDIO SIGNALS

[75] Inventor: Roy J. Mankovitz, Encino, Calif.

[73] Assignee: E Guide, Inc., Beverly Hills, Calif.

[*] Notice: The term of this patent shall not extend beyond the expiration date of Pat. No. 5,499,103.

[21] Appl. No.: 176,216

[22] Filed: Dec. 27, 1993

Related U.S. Application Data

[63] Continuation-in-part of Ser. No. 139,590, Oct. 20, 1993, Pat. No. 5,499,103.

[51] Int. Cl.⁶ .................................................. H04N 5/76
[52] U.S. Cl. .................................................. 386/96; 360/69
[58] Field of Search .................................. 358/335, 341, 358/342, 343; 360/19.1, 33.1, 69; 386/96–107, 39; H04N 5/76, 5/92

[56] References Cited

U.S. PATENT DOCUMENTS

| | | | |
|---|---|---|---|
| 4,025,851 | 5/1977 | Hasselwood et al. | 325/31 |
| 4,797,750 | 1/1989 | Karweit | 338/335 |
| 4,953,153 | 8/1990 | Suzuki | 358/343 |
| 5,499,103 | 3/1996 | Mankovitz | 358/341 |

*Primary Examiner*—Thai Tran
*Attorney, Agent, or Firm*—Christie, Parker & Hale, LLP

[57] ABSTRACT

Apparatus and methods for a television guide are provided. The method includes the steps of transmitting a television guide encoded as audio tones, starting to record the transmitted television guide on a VCR tape, decoding audio signals from an audio output on the VCR, commanding the VCR to stop recording in response to a first decoded audio signal, and storing a television guide decoded from audio signals while the VCR is stopped. In another embodiment of the invention a method includes the steps of providing a VCR having a signal input line and a clock having an output as a function of time, entering and storing a channel, time-of-day and length for a program to be recorded by the VCR, comparing the clock output with the time-of-day, commanding the VCR to start recording the channel when the clock output compares with the time-of-day, switching a first signal source to the signal input line when the clock output compares with the time-of-day, decoding a television guide from television signals on the signal input line, storing the television guide, commanding the VCR to stop recording the channel when the clock output minus the time-of-day compares with the length, and switching from the first signal source to a second signal source when the clock output minus the time-of-day compares with the length.

22 Claims, 18 Drawing Sheets

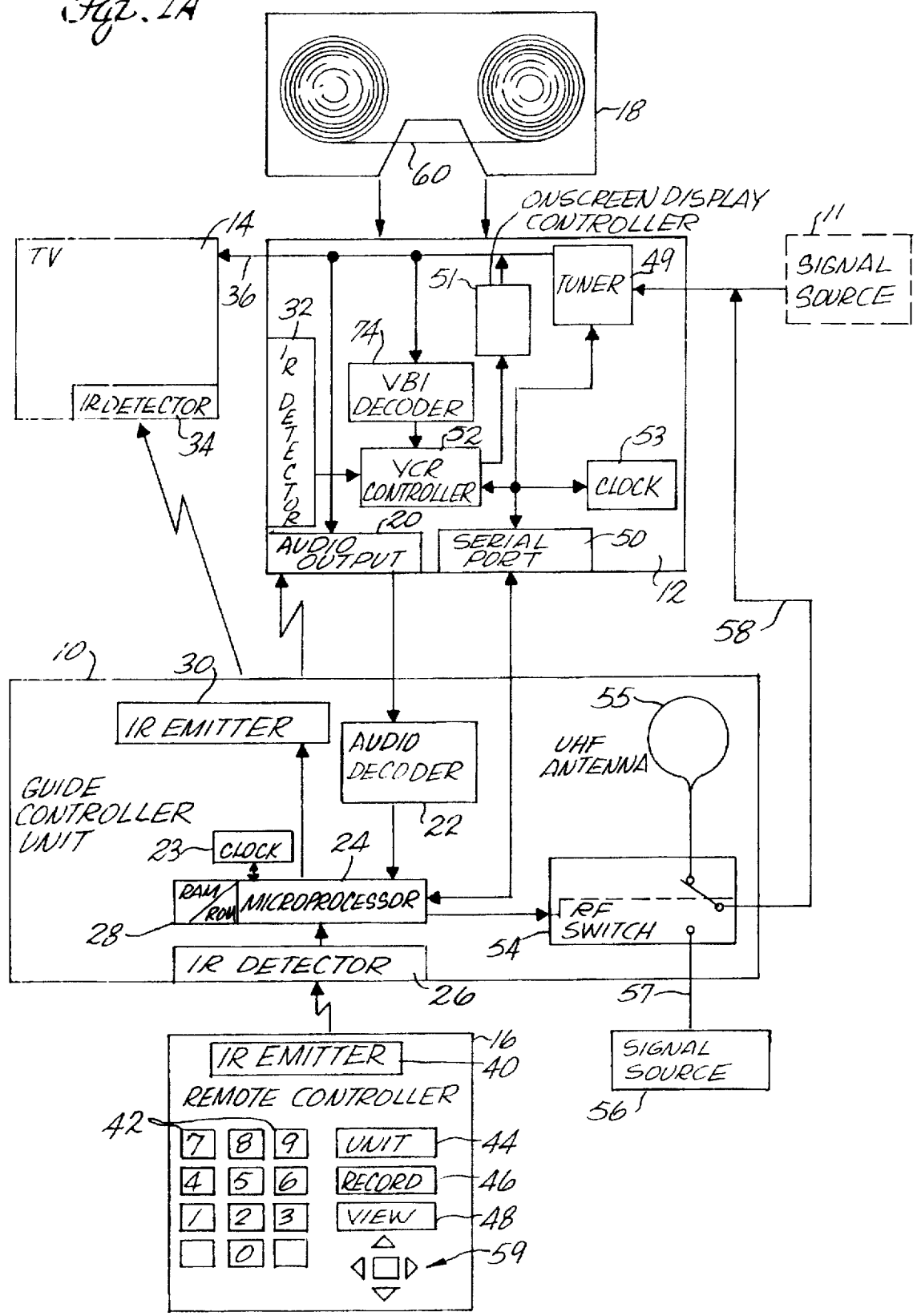

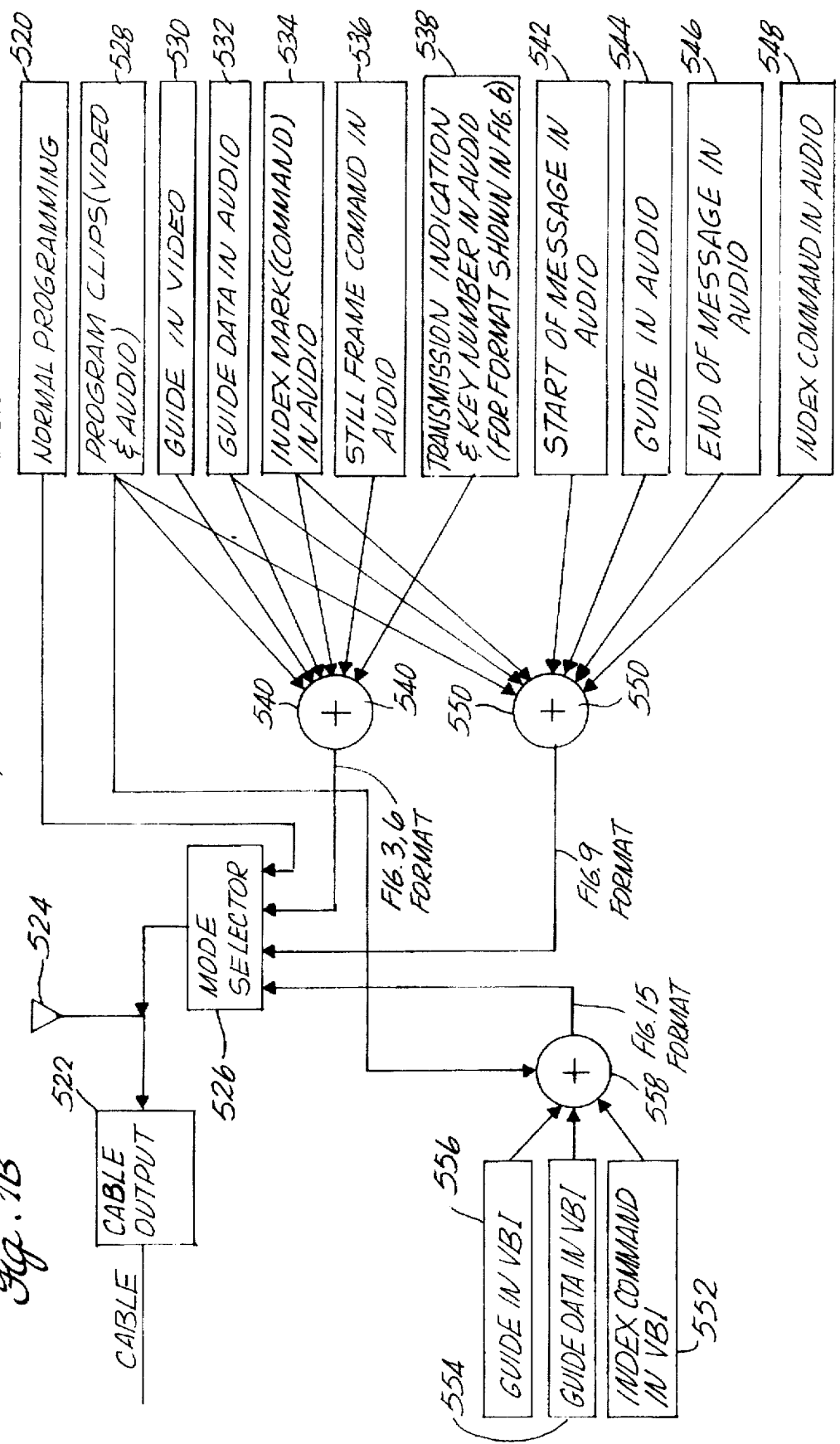

Fig. 3

| | 62 VISS | 68 VISS | 69 VISS | 68 VISS | VISS | VISS | VISS | 63 VISS | | |
|---|---|---|---|---|---|---|---|---|---|---|
| 62 CONTROL TRACK | | | | | | | | | | |
| 64 VIDEO TRACK | 70 GUIDE 1. ALADDIN (CH.2, 9/6, 2PM, 2HRS) 2. WAR & PEACE (2/5/96) 3. 4. | 74 CLIP #1 (MULTIPLE FRAMES) | | 78 REPEAT GUIDE | 82 CLIP #2 | 78 REPEAT GUIDE | | | | |
| 66 AUDIO TRACK | 72 GUIDE DATA CLIP #1 NUMBER OF VISS MARKS TO CLIP COMPRESSED CODE CDTL CLIP #2 ... & STILL FRAME COMMAND | 76 AUDIO ACCOMPANY- ING CLIP | | 80 GUIDE DATA STILL FRAME COMMAND | 84 AUDIO ACCOMPANY- ING CLIP | 80 GUIDE DATA STILL FRAME COMMAND | | | | |

APPARATUS AND METHODS FOR DERIVING A TELEVISION GUIDE FROM AUDIO SIGNALS

This is a continuation-in-part of patent application Ser. No. 08/139,590 filed Oct. 20, 1993, now U.S. Pat. No. 5,499,103, which is incorporated herein by this reference, as though set forth in full.

BACKGROUND OF THE INVENTION

This invention relates generally to electronic guides and particularly to television guides, such as television program schedule guides. This invention also relates to the indexing of an television guide with video clips.

Program guides that can be used to select programs for viewing or recording are commonly available in newspapers. An on screen television guide is desirable so that a viewer can access the guide directly without consulting another media.

Previews of upcoming movies or television programs and infomercials are commonly shown to generate interest in them. One technique is to show clips of the video before or after the full presentation of another program. This is done both for television programs or movies to be shown on television. Increasingly common is the inclusion of video clips of other movies on a rented video cassette tape. The renter of the video cassette tape rents the tape to watch a particular movie, but also can watch the previews, which are put onto the otherwise unused tape in the video cassette. A problem with this conventional technique is that the viewer must watch the entire tape to ascertain which previews are present.

Accordingly, there is a need in the art for apparatus and methods for a television guide. Apparatus and methods for accessing recorded video clips are also needed. There is also a need for apparatus and methods for receiving and recording a television guide that has been transmitted.

SUMMARY OF THE INVENTION

According to the present invention, apparatus and methods for a television guide are provided. The method includes the steps of transmitting a television guide encoded as audio tones, starting to record the transmitted television guide on a VCR tape, decoding audio signals from an audio output on the VCR, commanding the VCR to stop recording in response to a first decoded audio signal, and storing a television guide decoded from audio signals while the VCR is stopped. In another embodiment of the invention a method includes the steps of providing a VCR having a signal input line and a clock having an output as a function of time, entering and storing a channel, time-of-day and length for a program to be recorded by the VCR, comparing the clock output with the time-of-day, commanding the VCR to start recording the channel when the clock output compares with the time-of-day, switching a first signal source to the signal input line when the clock output compares with the time-of-day, decoding a television guide from television signals on the signal input line, storing the television guide, commanding the VCR to stop recording the channel when the clock output minus the time-of-day compares with the length, and switching from the first signal source to a second signal source when the clock output minus the time-of-day compares with the length.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 1A is a schematic showing apparatus for a television guide according to the present invention.

FIG. 1B is a block diagram of the transmission system according to the present invention.

FIG. 3 is a drawing showing a tape layout having a television guide with video clips according to the present invention.

DETAILED DESCRIPTION OF THE SPECIFIC EMBODIMENTS

Figure 2A:
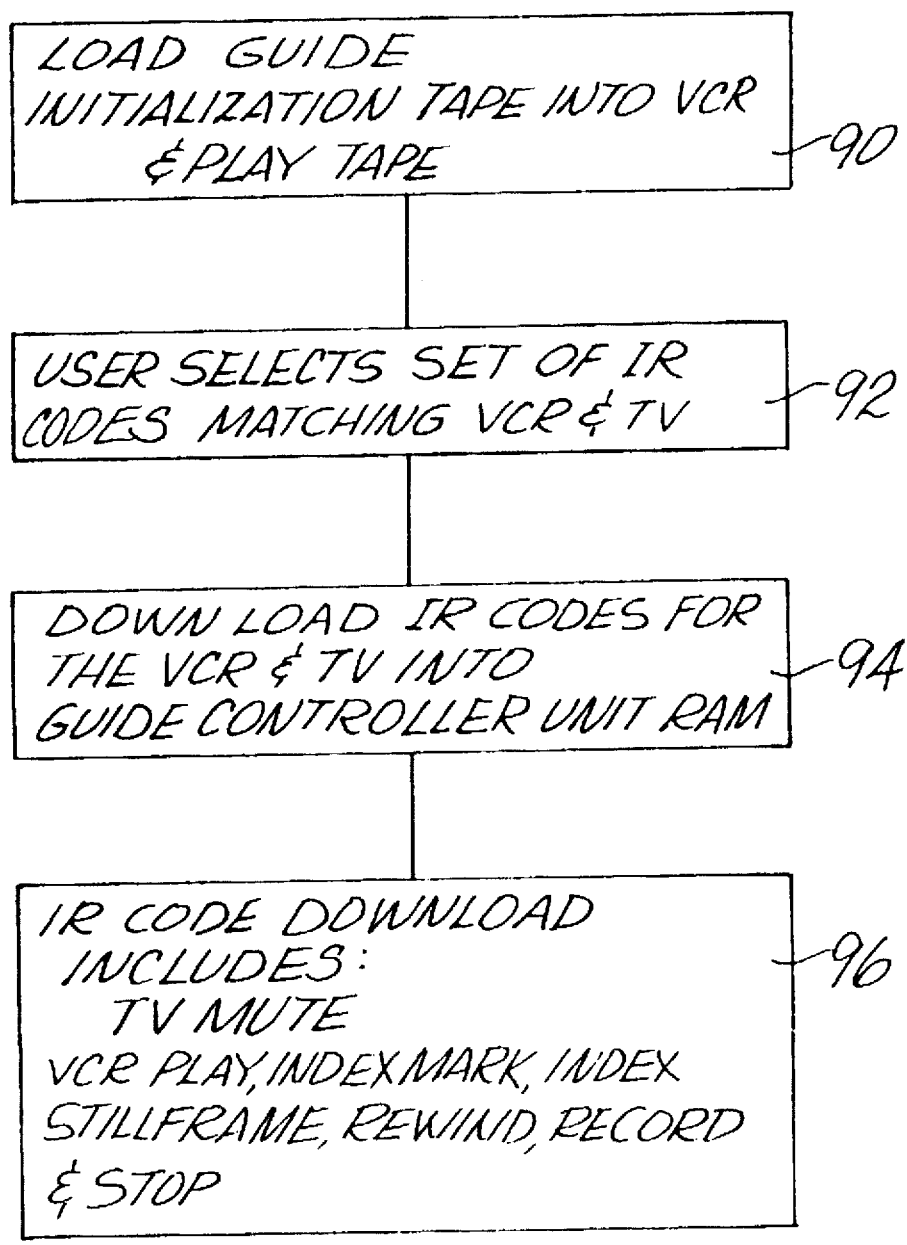
FIG. 2A is a flow graph of steps for initializing the apparatus for a television guide according to the present invention.

Referring to the drawings, a guide controller unit 10 is shown in FIG. 1A. The guide controller unit 10 is coupled to the VCR audio output 20 and the serial port 50 of the video cassette recorder 12. When a video cassette tape 18 is played in the video cassette recorder 12, the program recorded on the tape can be viewed on television 14, which receives the television signal on line 36. The video cassette tape 18 may be a prerecorded tape, or can be created by recording on the video cassette recorder 12 the signals from signal source 11 or from line 58 from the guide controller unit 10, as will be explained. The signal source 11 can include sources such as a television antenna, a television cable, or a satellite receiver, and in some embodiments line 58 is not present so signal source 11 is the only signal source. If the line 58 is present, then signal source 11 is not used and the line 58 is coupled via RF switch 54 to either UHF antenna 55 or to signal source 56. The signal source 56 can include sources such as a television antenna, a television cable, or a satellite receiver.

The VCR 12 includes a tuner 49, an on screen display controller 51, a VCR controller 52, a clock 53 having an output that is a function of time, an audio output 20, a serial port 50, and a vertical blanking interval (VBI) line decoder 74. The VCR controller 52 can be implemented with a microprocessor or logic to control the VCR and communicates to the tuner 49, the on screen display controller 51, the clock 53 having an output that is a function of time, the serial port 50, the vertical blanking interval (VBI) line decoder 74 and an infrared detector 32. The audio output is coupled to tuner 49.

The guide controller unit 10 has an audio decoder 22 which is connected to VCR audio output 20, a microprocessor 24 with a memory 28, a clock 23 having an output that is a function of time, an infrared emitter 30, and an infrared detector 26. As shown in FIG. 1A, the microprocessor 24 communicates with audio decoder 22, clock 23, infrared emitter 30, infrared detector 26 and memory 28. The microprocessor 24 also communicates to serial port 50 in VCR 12, and to RF switch 54, which is coupled to the UHF antenna 55 and the signal source 56.

The remote controller 16 communicates with guide controller unit 10 and has number keys 42, an initialization key 44, a record key 46, a view key 48, and a cursor controller 59, the operation of which are explained further below. The remote controller 16 has an infrared emitter 40 that can communicate to infrared detector 26 on guide controller unit 10.

The infrared emitter 30 on guide controller unit 10 communicates with both the infrared detector 32 on video cassette recorder 12 and the infrared detector 34 on television 14. The remote controller 16 does not operate the video cassette recorder 12 or television 14 directly. The remote controller 16 communicates with guide controller unit 10 and the guide controller unit 10 controls the video cassette recorder 12 and television 14 through the emissions of infrared emitter 30 to the infrared detector 32 and the infrared detector 34.

The television 14 is assumed to have a mute control feature for turning off the sound of the television upon command. The video cassette recorder 12 is assumed to have the following features: play, rewind, record, stop, index, index mark, and still frame.

FIG. 1B is a block diagram of the transmission system for transmitting a guide according to the present invention. The transmission system includes a cable output 522, means 524 for over the air or satellite transmission and a means for selecting a mode of transmission 526. In one mode normal programming 520 is transmitted. In another mode the elements 528, 530, 532, 534, and 536, as described in FIG. 1B, are combined in combiner 540 to transmit guide and guide data with video clips, which can be recorded on a tape in the format shown in FIG. 3. In another mode the elements 528, 530, 532, 534, 536 and 538, as described in FIG. 1B, are combined in combiner 540 to transmit guide and guide data with video clips, which can be recorded on a tape in the format shown in FIG. 6. In yet another mode the elements 528, 532, 534, 542, 544, 546 and 548, as described in FIG. 1B, are combined in combiner 550 to transmit guide and guide data with video clips, which can be recorded on a tape in the format shown in FIG. 9. In still another mode the elements 528, 552, 554, and 556, as described in FIG. 1B, are combined in combiner 558 to transmit guide and guide data with video clips, which can be recorded on a tape in the format shown in FIG. 15. The order of transmitting the elements in the modes is explained below in the discussions relative to FIGS. 3, 6, 9 and 15.

FIG. 2A is a flow graph of steps for initializing the apparatus of FIG. 1 for a television guide with video clips according to the present invention. A special initialization tape is loaded into the video cassette recorder 12 in step 90 and the initialization tape is played. The initialization tape has encoded in its audio track the infrared code libraries for substantially all types of VCRs and televisions. When the tape is played, video cues are displayed on the television 14 to enable the user to locate the codes for the particular type of television and VCR in use. Then the infrared codes for the user's VCR and television are downloaded into memory 28 via VCR audio output 20. The audio decoder 22 decodes the audio output signal and the microprocessor 24 stores the infrared codes into memory 28. Alternately the infrared codes for the televisions and VCRs can be stored in ROM in memory 28 and the user is provided a method of selecting the proper subset of infrared codes to match the particular television and VCR in use. The codes can also be used to send commands to the VCR 12 via the serial port 50. Once the infrared codes have been loaded into the memory 28 of the guide controller unit 10 the user can play a video cassette tape 18 with a television guide with video clips.

Referring to FIG. 2A, the initialization sequence for the guide controller unit 10 is to first load the initialization tape into the VCR and play the initialization tape in step 90. Then the user selects a set of infrared codes matching his particular VCR and television in step 92. Then in step 94 the infrared codes are downloaded from video cassette recorder 12 via VCR audio output 20 and audio decoder 22 into memory 28. The downloaded infrared codes include codes for television mute, VCR play, VCR rewind, VCR record, VCR stop, VCR index, VCR index mark, and VCR still frame, as shown in step 96.

Figure 2B:
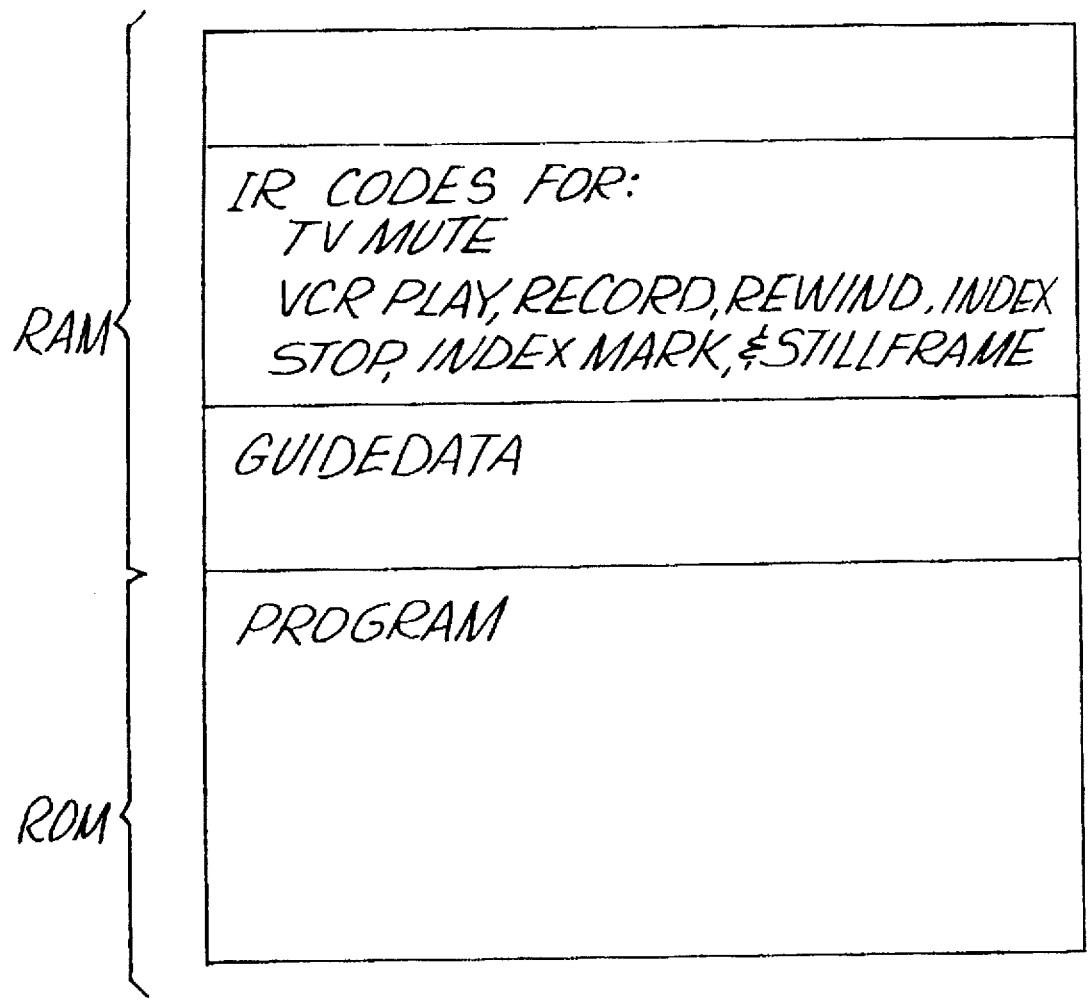
FIG. 2B is a design of the random access memory and the read only memory of the apparatus for a television guide according to the present invention.

FIG. 2B is a diagram of the contents of memory 28 including a read only memory portion for storing a program and random access memory portion for storing the infrared codes for the television and the VCR.

FIG. 3 is a drawing showing a tape layout having a television guide with video clips according to the present invention. The tape 60 has a control track 62, a video track 64 and an audio track 66. As shown in FIG. 3, the first length of the tape has a VISS mark 68 in the control track 62. Second VISS mark 69 is also in control track 62. Between VISS mark 68 and VISS mark 69 a guide 70 is in the video track 64. As shown in FIG. 3, the guide 70 consists of an index to video clips on the tape. For example, the first video clip is *Aladdin* which will be shown on channel 2 on September 6th at 2:00 p.m. and has a length of two hours. The second video clip is *War and Peace* which has a compressed code of 21596. The compressed code is encoded CDTL information and compressed codes and their use are more fully explained in application Ser. No. 07/829,412, filed Feb. 3, 1992, which is incorporated herein by this reference, as though set forth in full.

In audio track 66, guide data associated with the guide is encoded as audio tones. The guide data 72 includes for each video clip on the guide 70, the number of VISS marks from the guide to the respective video clip. The channel, day, time-of-day and length (CDTL) or another program identifier can be encoded as tones within the guide data for each video clip. Also, a compressed code compressed in length from the CDTL and containing the information of the CDTL associated with the video clip can be encoded as tones within the guide data 72. At the end of the guide data is a still frame command, which is encoded as tones in the audio track 66.

In a second length of the tape following the guide and the guide data, the first video clip is located with the video for the clip written in the video track 64 and the audio that accompanies the video written within the audio track 66. A VISS mark 69 is written at the beginning of the video clip in control track 62 and a VISS mark 68 is also written at the end of the video clip in control track 62.

Following the video clip, the guide is repeated in video track 64, as shown by guide 78 in FIG. 3 and guide data 80 is written into audio track 66. The guide data 80 is not the same as the guide data 72, because the number of VISS marks to a video clip from guide data 80 is different from the number of VISS marks to a video clip from guide data 72. As shown in FIG. 3 the second video clip follows guide 78 and the audio 84 accompanying the second video clip is written in audio track 66. The pattern of repeating the guide and guide data after each video clip is repeated across the tape. As the tape is played on video cassette recorder 12 the guide is displayed on television 14 and the guide data is sent via VCR audio output 20 and audio decoder 22 to microprocessor 24. At the end of the guide data is a still frame command. When this is decoded by audio decoder 22 the microprocessor 24 sends a still frame command via infrared emitter 30 and infrared detector 32 to video cassette recorder 12. The guide is then displayed as a frozen frame on television 14. To access a video clip the user pushes one of the number keys 42 and then pushes view key 48. For example, pushing key number 3 and the view key will access the third video clip listed in the guide. The guide controller unit 10 sends index commands to video cassette recorder 12 via infrared emitter 30 and infrared detector 32 to advance or rewind the tape to the video clip selected by the user. This is accomplished by guide controller unit 10 by processing the decoded guide data to determine the number of VISS marks forward or backward on the tape to the video clip selected by the user. Then the guide controller unit 10 via infrared emitter 30 and infrared detector 32 commands the video cassette recorder 12 to advance or rewind by the number of VISS marks to the selected video clip.

Figure 4:
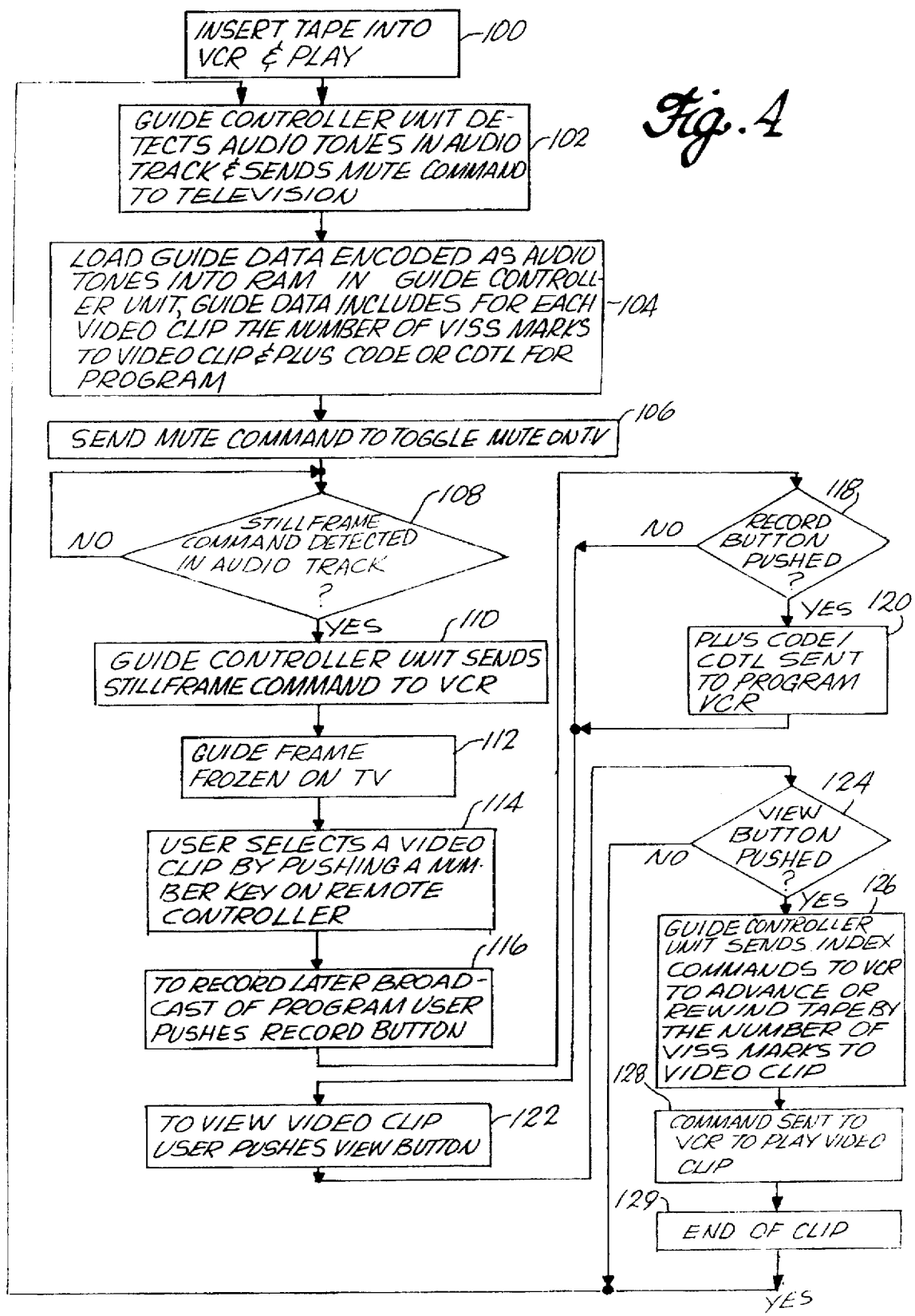
FIG. 4 is a flow graph of steps for using the apparatus for a television guide with video clips according to the present invention.

The steps for using the apparatus for a television guide with video clips according to the present invention is further described in FIG. 4. In step 100, a tape 18 with a television guide with video clips, such as shown in FIG. 3, is inserted into video cassette recorder 12 and the video cassette recorder 12 is commanded to play the tape. In step 102 the guide controller unit 10 decodes the audio tones in the tape audio track, which are sent to guide controller unit 10 via VCR audio output 20 to audio decoder 22. Upon determining the audio tones are being received the guide controller unit 10 sends a mute command to television 14. Sending the mute command avoids the annoyance the audio tones would otherwise cause to a listener. Then in step 104 the guide data is loaded into the RAM portion of memory 28. As explained before, the guide data includes for each movie clip on the tape the number of VISS marks to the video clip and optionally encoded CDTL information in a compressed code, or channel, day, time-of-day and length for a program that corresponds to the video clip. After the audio data has been stored in memory 28, the mute command may be sent again to television 14 via infrared emitter 30 and infrared detector 34 to toggle the mute switch on television 14 and turn the sound back on. Then in step 108 the guide controller unit 10 searches for a still frame command in the audio tones being sent via VCR audio output 20 to audio decoder 22 in guide controller unit 10. If a still frame command is detected in the audio track then the guide controller unit 10 sends a still frame command to video cassette recorder 12 thereby freezing the current frame being transmitted to the television from the VCR. In step 112 the guide is frozen on television 14. In step 114 the user selects a video clip to view or record by pushing a number key 42 on remote controller 16. For example, for the guide shown in FIG. 3, if the user wants to view the video clip for *War and Peace*, then the user would push the number key 2 and then the view button 48. After pushing the number for the selected video clip, the user may also select to record the later transmission of the program by pushing the record button 46 on remote controller 16, as shown in step 116. If the record button is pushed, as determined in step 118 then the compressed code or the CDTL information for the selected video clip is sent to video cassette recorder 12 to program the VCR. The compressed codes are compressed from the combination of channel, day, time-of-day and length for a program and are now commonly published in newspapers to assist in the recording of programs on VCRs.

To view the selected video clip the user pushes view button 48, as shown in step 112 of FIG. 4. If the view button has been pushed as determined by step 124, then in step 126 the guide controller unit 10 sends index commands to video cassette recorder 12 to advance or rewind the tape by the number of VISS marks to the selected video clip. Then in step 128 a command is sent to video cassette recorder 12 to play the selected video clip. At the end of the video clip (step 129) the guide controller unit 10 again detects audio tones in audio track 66 and sends a mute command to the television as shown in step 102. Then steps 104, 106, 108, 110 and 112 are repeated and the user can select another video clip to view or to record. The first time the guide is displayed to the user, the user will most likely select to view a video clip by performing steps 114 and 122 and then the next time the guide is displayed to the user, the user having seen the video clip could decide to record the program when it is transmitted at a later time by performing steps 114 and 116. However, it is possible for the user to select to record a program before viewing the video clip for the program.

In the description so far it has been assumed that the user is provided with a video cassette tape with a television guide with video clips. Another embodiment of the invention is to transmit the television guide with video clips rather than to provide it directly on a video cassette tape. A number of issues arise when the television guide with video clips is transmitted rather than delivered on a video cassette tape. The first is that with a video cassette tape the user can be charged either a sales fee or a rental fee for the video cassette tape. In the case of a transmission other provisions have to be made in order to charge the user for the television guide with video clips. The television guide with video clips can be transmitted on a channel at a time when the cost of transmission is low. During the transmission the guide controller unit 10 must be turned off during the receipt of the transmission, so that the operations described in FIG. 4 are not executed. For example, if during the transmission the guide controller unit 10 is turned on, then still frame commands detected in the transmission would result in a still frame command to the VCR. This would stop the recording of the transmission. One way to ensure that the guide controller unit is off, is to automatically turn off the guide controller unit at a certain time at night, when the transmission is scheduled, as shown in step 144. One method to implement turning off the guide control unit is to program the microprocessor to ignore all received information when the time on clock 23 is between certain times, such as between 3 a.m. and 3:30 a.m. In step 146 of FIG. 5 the transmission is recorded on tape by the video cassette recorder 12.

After the transmission is complete the tape is rewound in step 148 and the guide controller unit 10 is turned on. Then to use the tape in the manner described in FIG. 4 the tape must be initialized. In step 150 the user pushes INIT key 44 on remote controller 16. One method of obtaining revenue for the use of the television guide with video clip transmission is to have the user call a 900 number to obtain a key number as shown in step 152. The user then enters the key number on remote controller 16 as shown in step 154. In step 156 the entered key number is sent to guide controller unit 10 from remote controller 16. Then in step 158 guide controller unit 10 sends a play command to video cassette recorder 12. At the beginning of the tape a key number has been received and recorded from the transmission into the tape audio track. In step 160 the key number transmitted and recorded on tape is sent via the VCR audio output 20 to audio decoder 22 in guide controller unit 10 and compared to the key number that was entered on remote controller 16. If in step 163 it is determined that the entered key numbers and the transmitted key numbers do not compare, then in step 164 the operation of the guide controller unit 10 is aborted which prevents the guide controller unit 10 from operating properly to allow access of the video clips that are recorded on the tape. If the numbers do compare, then the tape will be initialized. In the transmission VISS marks are not transmitted so the recorded tape at this point in the process has no VISS marks written on the tape. However, the transmission does have audio tones in the audio track that are placed in the audio track at the location that a VISS mark should be located in the control track. These audio tones are encoded to represent an index mark. When an index mark audio tone is detected in audio decoder 22, then the guide controller unit 10 sends an index mark command to the video cassette recorder 12 and a VISS mark is written on the tape in the control track. This completes the initialization of the tape which can then be rewound and used in the manner described in FIG. 4.

Figure 5:
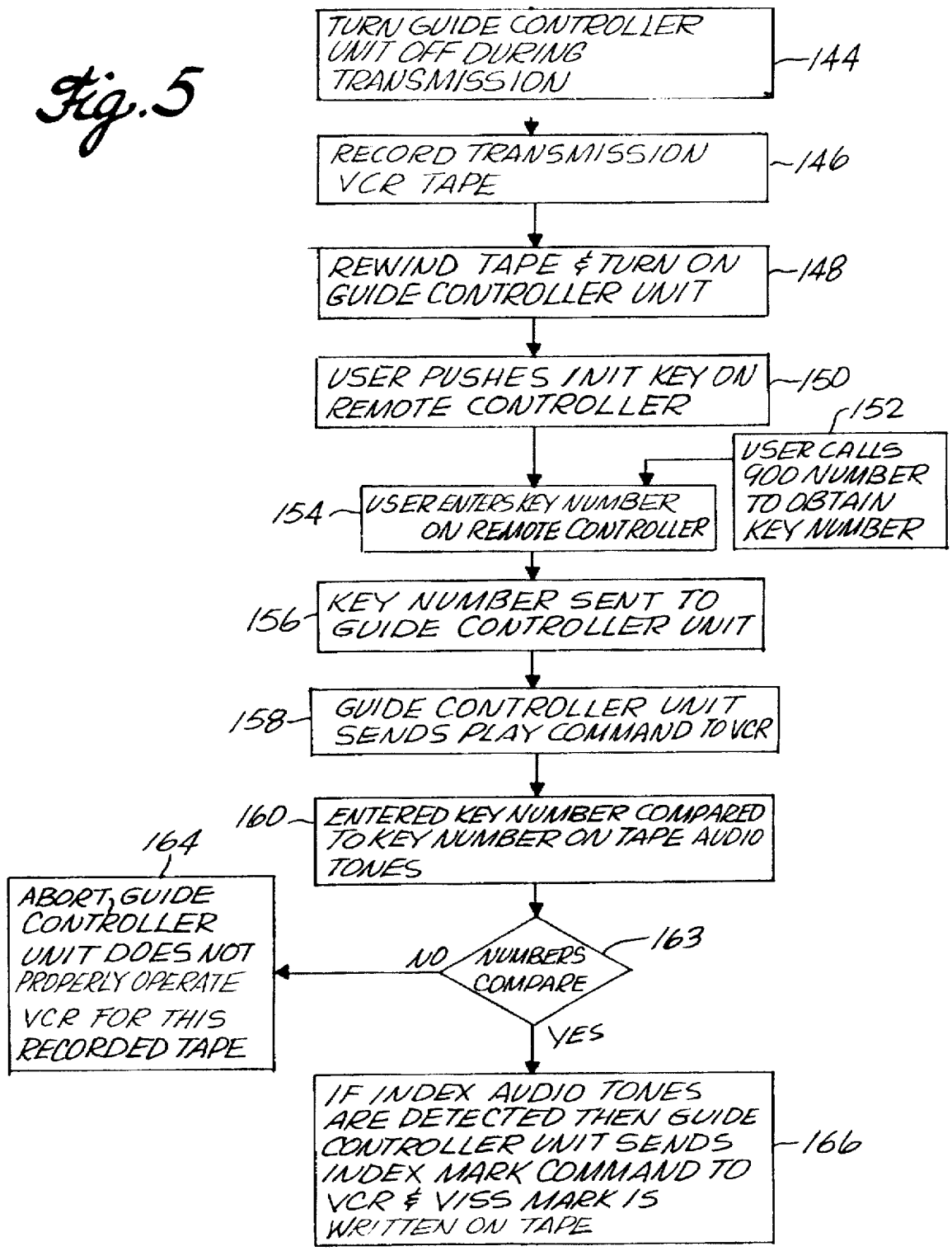
FIG. 5 is a flow graph of steps for using the apparatus for a transmitted television guide with video clips according to the present invention.
Figure 6:
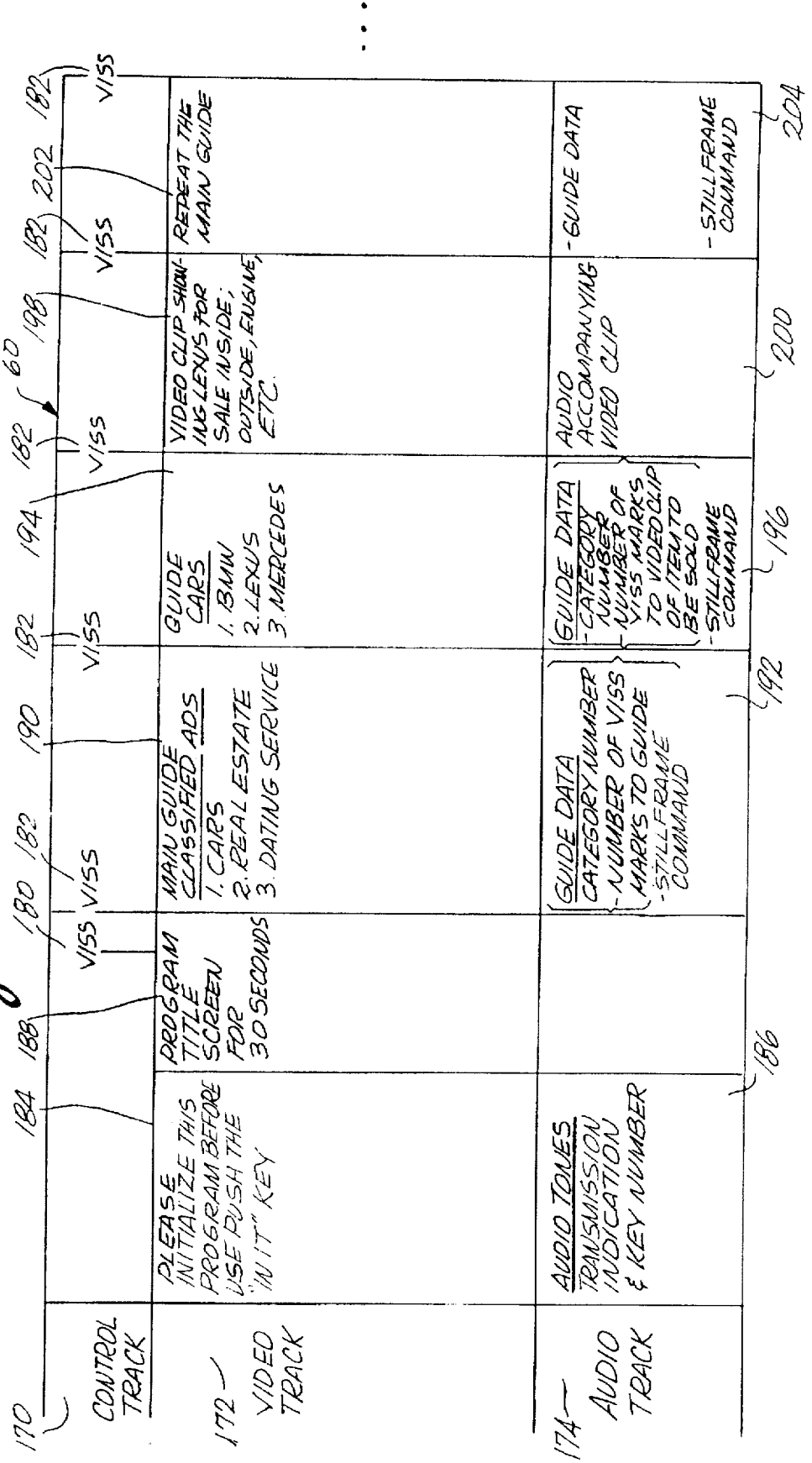
FIG. 6 is a drawing showing a tape layout having a television guide with video clips according to the present invention.

The method described in FIG. 5 is somewhat inconvenient because the guide controller unit 10 must be turned off during the transmission. FIG. 6 illustrates a tape recording of a transmitted television guide with video clips. In the recorded video track there is a message at the beginning of the transmission which indicates to the user to push the INIT key 44 in order to initialize the tape for use. In the audio track of the recorded tape in position 186 there are audio tones encoded to provide a transmission indication and also audio tones encoded to signify a key number. Following sections 184 and 186 of the recording is a title screen 188 which has a length of about thirty seconds. Following the title screen is a guide 190. Corresponding to guide 190 is the guide data 192 in the audio track 174.

FIG. 6 illustrates using a television guide with video clips for infomercials. The main guide 190 is an index to categories of infomercials and then each category has its own guide. For example, the guide for the cars selection in the main guide 190 is guide 194 which has a list of further selections for BMW, LEXUS and Mercedes. The guide data 192 stores the number of VISS marks to another guide, for example, guide 194. Each guide has a corresponding guide data in the audio track and at the end of the guide data is a still frame command. The still frame command freezes the guide on the television, which allows the viewer to select one of the items listed in the guide. The guide data has the number of VISS marks to the video clips corresponding the items listed in the guide. A video 198 showing data for a LEXUS has video 198 in the video track 172 and audio 200 in the audio track 174. After each video clip the main guide is repeated. Guide data corresponding to the main guide accompanies the guide in the audio track 174; however, the guide data on a repeated main guide such as guide data 204 is not the same as guide data 192, because the number of VISS marks to a selected entry is different for guide data 204 and guide data 192. If the infomercial format of FIG. 6 is not transmitted but is provided directly on tape, then the tape would not have the initialize message 184 and would not have the transmission indication and the key number 186.

The VISS marks as shown in FIG. 6 are not present in the transmission. So it is again necessary to insert the VISS marks into the control track of a tape that records the transmission. FIG. 5 illustrates one method of inserting the VISS marks into the recorded tape which has been described; however, in FIG. 5 it was necessary to turn off the guide controller unit 10 in step 144.

Figure 7:
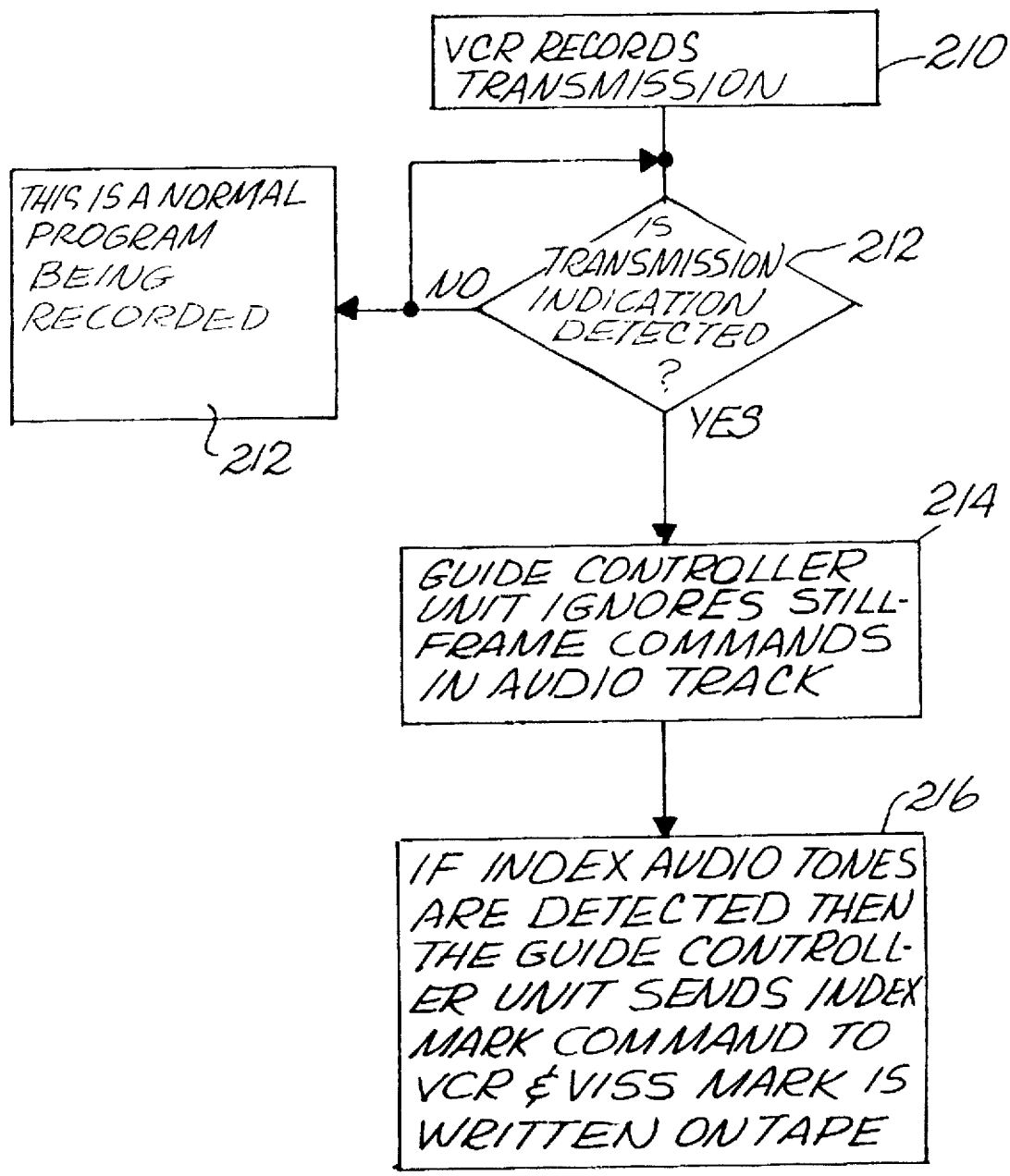
FIG. 7 is a flow graph of steps for initializing a television guide with VISS marks during a transmission and recording of a television guide with video clips according to the present invention.

FIG. 7 shows an alternate way to insert VISS marks onto the tape that is recording the transmitted television guide with video clips. In step 210 the VCR has been commanded to record a transmission. As the VCR records the transmission the audio track of the transmission is sent via VCR audio output 20 to the audio decoder 22 in the guide controller unit 10. Step 212 determines whether a transmission indication has been detected in the audio tones. If the transmission indication is not detected then this is just a normal program being recorded as indicated in step 212. If a transmission indication is detected then the guide controller unit 10 ignores any still frame commands that are in the audio track and decoded by step 22. Index audio tones are transmitted in the transmission at the locations where VISS marks are required to be written in the control track. In step 216 if index audio tones are received from the audio output 20 and decoded by audio decoder 22 then the guide plus unit 10 sends a index mark command to the video cassette recorder 12 which writes a VISS mark onto the control track of the tape. One advantage of this technique is that the VISS marks are written onto the tape during the transmission of the television guide with video clips.

Figure 8:
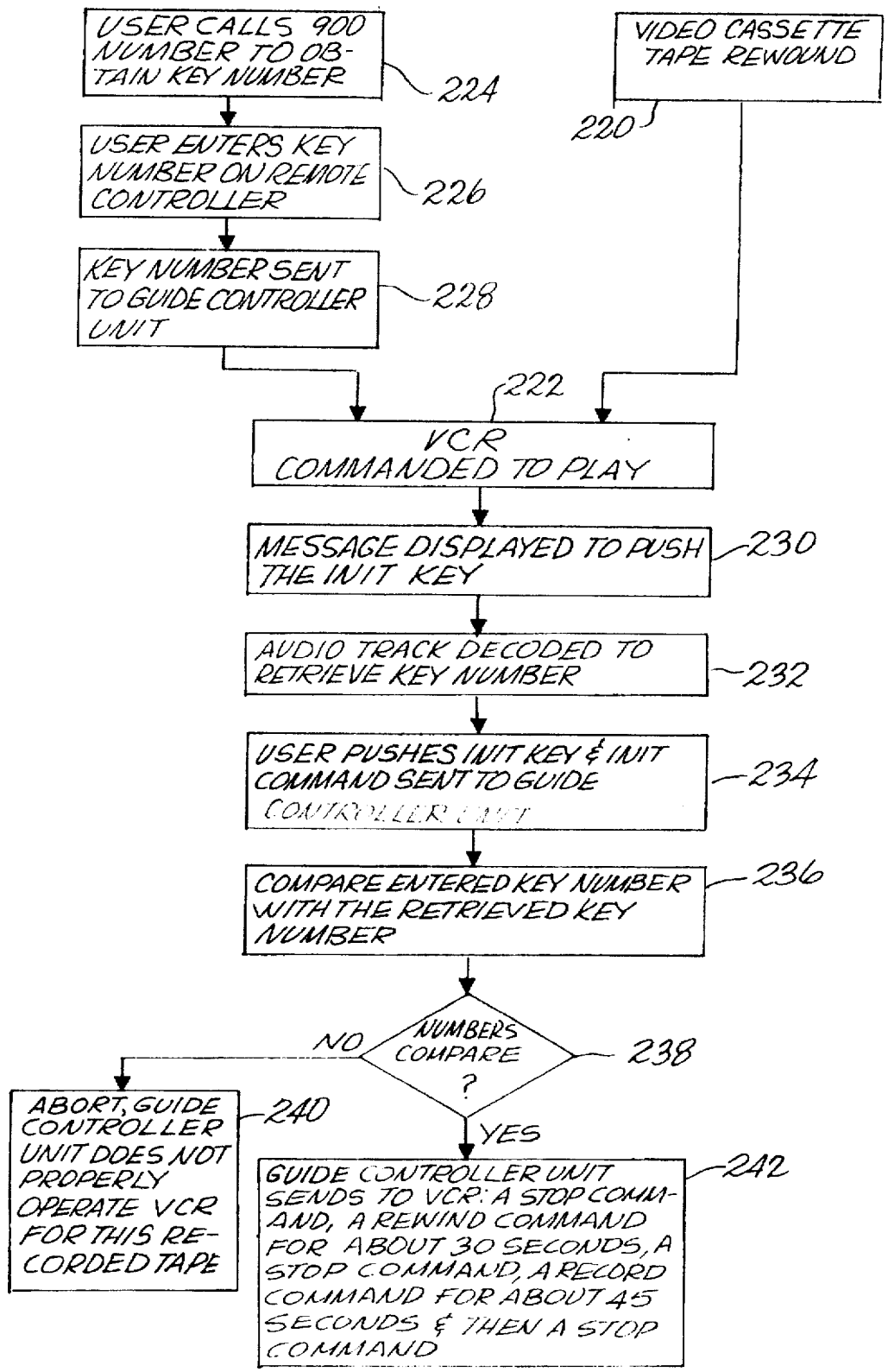
FIG. 8 is a flow graph of steps for initializing a tape after a transmission and recording of a television guide with video clips according to the present invention.

To use the tape that has been recorded by the steps of FIG. 7, the user must first rewind the tape as shown in step 220 of FIG. 8. Then to charge the user for using the television guide with video clips, in step 224 the user calls a 900 number to obtain a key number. In step 226 the user enters the key number on number keys 42 of remote controller 16. In step 228 the entered key number is sent to guide controller unit 10 and stored in memory 28. Then in step 222 the video cassette recorder 12 is commanded to play. The message 184 of FIG. 6 is displayed to the user asking the user to push the INIT key 44 on remote controller 16. The key number from guide data 186 in FIG. 6 is retrieved from the audio track in step 232. In step 234 the user pushes the INIT key 44 and an initialization command is sent from remote controller 16 to guide controller unit 10. In step 236 the entered key number is compared with the retrieved key number. If the key numbers do not compare as determined by step 238, then the operation of guide controller unit 10 will be aborted in step 240 so that the tape will not operate properly in video cassette recorder 12. If the key numbers do compare, then guide controller unit 10 sends to the video cassette recorder 12 a stop command, then a rewind command for about thirty seconds, then a stop command, then a record command for about forty-five seconds and finally a stop command, as shown in step 242. Step 242 effectively erases from the tape the message 184 to initialize the tape and the corresponding audio tones which have the transmission indication and the key number as shown in element 186 of FIG. 6. After step 242 is executed the tape may be played in the manner indicated in FIG. 4. The timing intervals of step 242 are chosen so that the VCR 12 will rewind far enough so that the tape is at a point before the elements 184 and 186 of FIG. 6, and so that the VCR 12 stays in the record mode for a sufficient time to erase the elements 184 and 186 of FIG. 6, stopping at a point where the video is displaying the title of the program. A VISS mark is placed near the end of the title screen 188 of FIG. 6, so that on subsequent play sessions the user can use the index feature of the VCR 12 to fast-forward to the title. With the items 184 and 186 erased then when the tape is subsequently played the guide controller unit 10 will treat the tape as it would a prerecorded tape. For example, the still frame commands will not be ignored, and any index audio tones in the audio track will be ignored.

Again, the advantage of the methods of FIG. 7 and 8 is that the guide controller unit 10 does not have to be turned off during the transmission of the television guide with video clips.

The television guide with video clips can be used for showing previews of television programs or movies and can also be used for classified advertisements and infomercials, such as for cars and real estate. The television guide with video clips can also be used for video magazines and yellow pages.

In another embodiment of the invention, the entire guide is transmitted as tones encoded in the audio. One reason to transmit the guide in the audio is that the audio will not be stripped by a cable company from the television signal. There are several ways to avoid annoying the listener when the tones are played. First, it is assumed that the guide is transmitted during the night when channel rates are lower and the user's television is off—hence the audio tones will not be heard. During subsequent playback if a start message audio tone, which indicates the beginning of the guide, is detected by the audio decoder 22 in guide controller 10, then the guide controller 10 will send a signal to the serial port 50 to cause the VCR 12 to mute the audio signal coming from the audio head. This effectively blocks any audio output from the VCR 12 to the television 14. An end of message audio tone at the end of the guide restores the audio.

Figure 9:
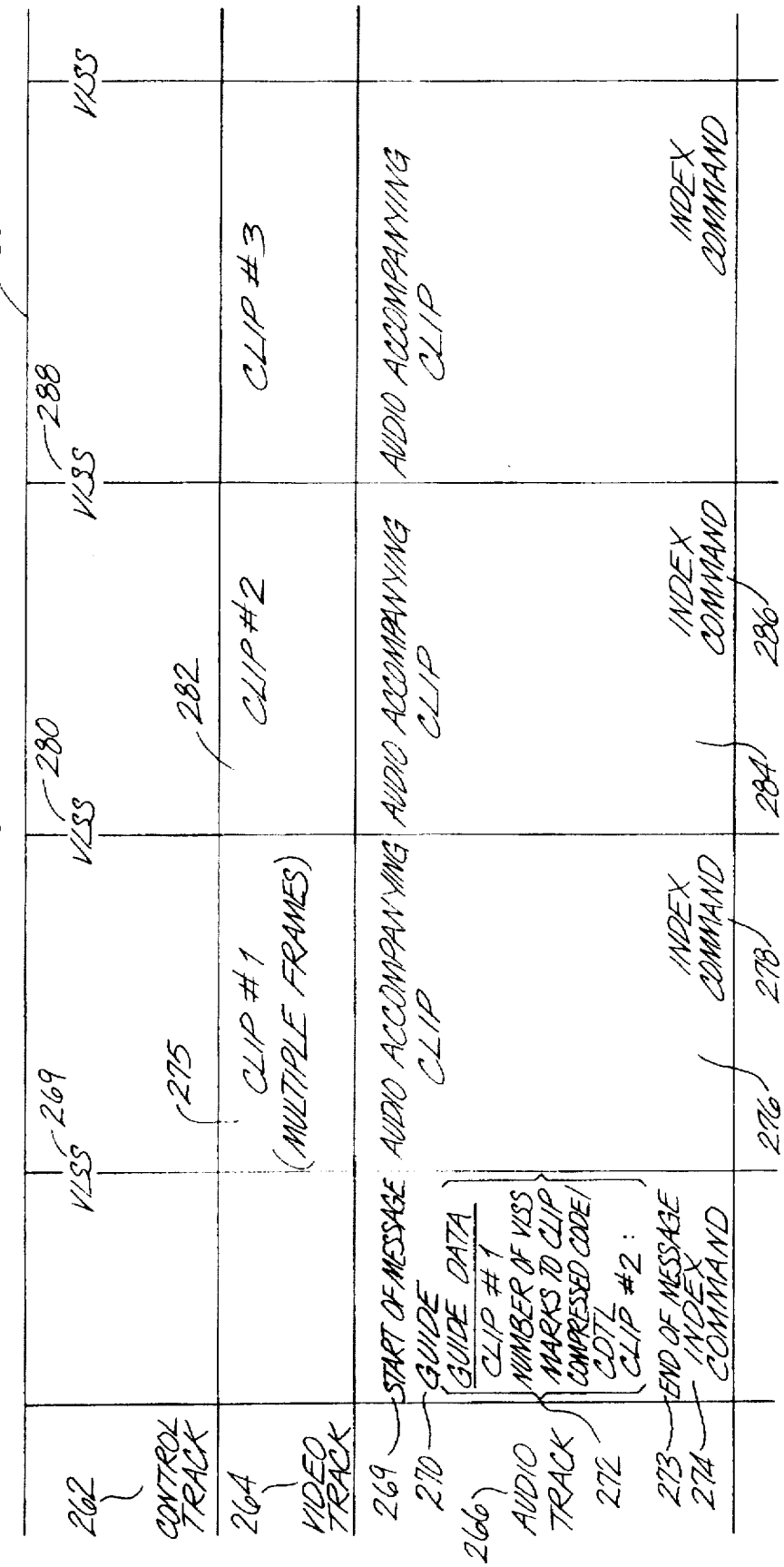
FIG. 9 is a drawing of a tape layout having a guide in the audio track according to the present invention.

FIG. 9 shows a section of tape that has been recorded by VCR 12 during the transmission of a guide in the audio. The tape 60 has a control track 262, a video track 264 and an audio track 266. At the beginning of the transmission a start of message 269 is transmitted in the audio signal and recorded in the audio track 266. Following the start of message 269, the guide 270 is transmitted and also recorded in the audio track 266. The guide 270 can be followed by the transmission of guide data 272 which is recorded in the audio track 266. At the end of the guide or the guide data the end of message 273 is transmitted and recorded in the audio track. In order to place an index mark on the tape, after the end of message 273, an index command 274 is transmitted and recorded in the audio track. When index command 274 is decoded by audio decoder 22 during the transmission, then the VCR 12 is commanded to write an index mark or VISS mark 269 into the control track 262. Following the transmission of the guide and guide data then video clips and audio accompanying the video clips can be transmitted. The guide data 272 can be used by a viewer to view a certain video clip by forwarding the tape from the beginning of the tape by the number of VISS marks to a clip as specified in the guide data. The guide data can also be used to specify the recording of a program corresponding to a video clip or an entry in the guide by entering a channel, day, time-of-day, and length for the program or entering a compressed code representing a channel, day, time-of-day, and length for a program.

At the end of each clip such as clip 275, an index command 278 is transmitted at the end of the audio accompanying the clip and decoded by audio decoder 22 to write VISS mark 280 onto the control track 262. The index command is also recorded into the audio track 266 during the transmission.

Figure 10:
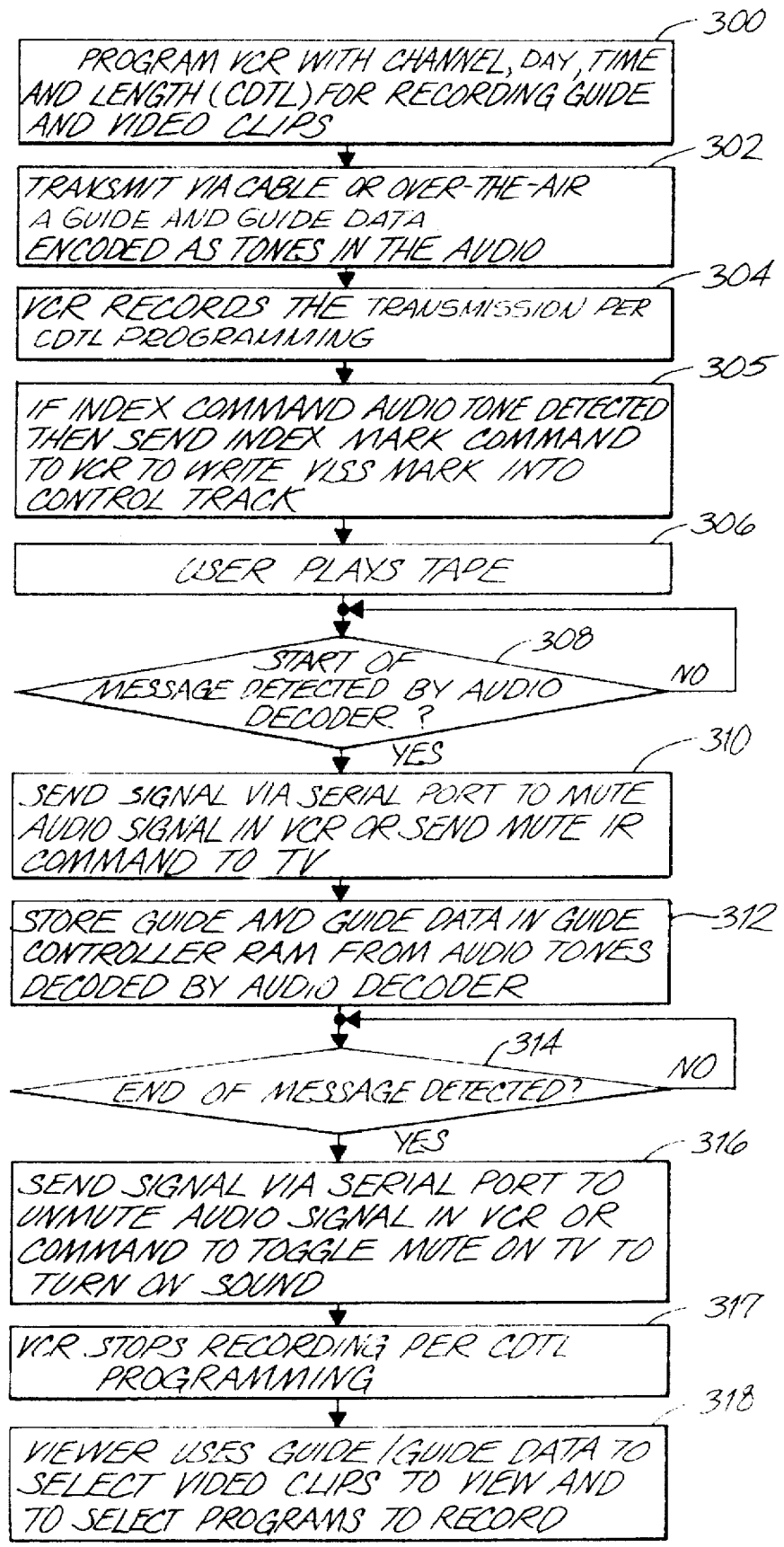
FIG. 10 is a flow graph of steps for using the apparatus for a television guide transmitted in the audio according to the present invention.

FIG. 10 is a flow chart of the method of using the guide controller 10 with the VCR 12 to record the guide and guide data. In step 300 it is shown that the VCR is programmed with channel, day, time-of-day, and length (CDTL) for recording during the time of transmission of the guide and the video clips. As discussed above this can be done by entering a compressed code compressed in length from the channel, day, time-of-day, and length (CDTL). Then in step 302 either via the cable or over the air transmission, the guide and guide data are transmitted encoded as tones in the audio signal. The VCR records the transmission at the time specified by the programming in step 304. During the recording if an index command audio tone is detected, then a index mark command is sent to the VCR to write a VISS mark into the control track as shown in step 305. After the transmission is recorded the user plays the tape in step 306. In step 308 it is determined whether a start of message 269 is detected by the audio decoder. If a start of message is detected then in step 310 the guide controller 10 sends a signal via the serial port 50 to VCR 12 to mute the audio signal in the VCR, which removes the audio signal from the television 14. Alternately, a mute command can be sent via infrared emitter 30 and infrared detector 34 to television 14. Then in step 312 the guide and guide data decoded from the transmission by audio decoder 22 is stored into RAM 28. In step 314 it is determined whether an end of message has been detected. If an end of message has been detected, then in step 316 a signal is sent via the serial port 50 to unmute the audio signal in the VCR. Alternately a command can be sent to toggle the mute signal on the television 14 in order to turn the television sound on. The VCR 12 continues to record the transmission until the length of the recording matches the length of the CDTL programming. Then in step 318 the viewer can use the guide and guide data to select video clips to view and to select programs to record in the future.

Figure 12:
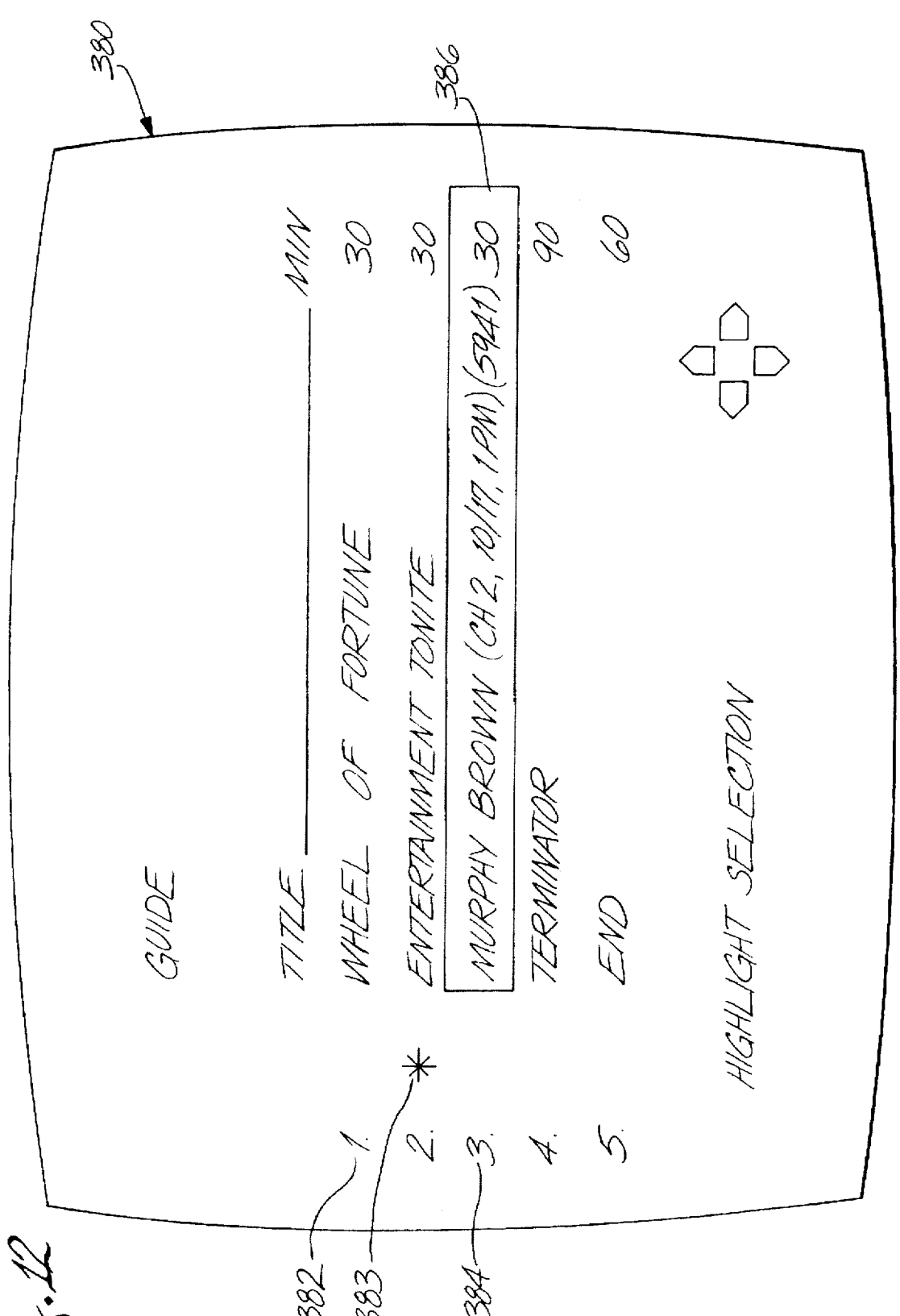
FIG. 12 is a display of a television guide on a television monitor according to the present invention.

The guide 270 transmitted and stored in the RAM 28 can be displayed on television 14 as shown as guide display 380 in FIG. 12. The user selects a program in the guide display 380, for example *Murphy Brown* 386, by operating cursor 59 on remote controller 16 to place a cursor on the program *Murphy Brown* 386 or by entering the number 3 on remote controller 16, as indicated by guide display element 384. To record a later transmission of the program the user pushes the record button 46 on remote controller 16. If the record button 46 is pushed then a compressed code or a channel, day, time-of-day and length for the selected program are sent to the VCR 12 to program the VCR 12 to record the program when it is transmitted. For example, for *Murphy Brown* the compressed code, as shown on FIG. 12, is 5941.

The compressed code is encoded CDTL information and compressed codes and their use are more fully explained in continuation-in-part application Ser. No. 07/829,412, filed Feb. 3, 1992, which is incorporated herein by this reference, as though set forth in full. The compressed codes each have at least one digit representative of, and compressed in length from, the combination of the channel, day, time-of-day, and length and can be decoded into channel, day, time-of-day, and length. If the guide is transmitted daily, then the day information is not necessary. Also contained in the guide display element 386 is the channel number, day, time-of-day and length for *Murphy Brown*, which are channel 2, October 17, 7:00 p.m. and 30 minutes.

A video clip may have been transmitted and recorded for certain programs in the guide 380. These can be marked in the guide by an asterisk (*) as shown in element 383 in FIG. 12. The user can select to view the clip for *Entertainment Tonite* by entering the number 2 and pressing view button 48. Then the guide controller will command the VCR to advance or rewind by the proper number of VISS marks to the beginning of the clip. The guide controller 10 can keep track of the position of the tape by tracking the number of VISS marks from the beginning of the tape. Therefore once the user has watched one video clip the guide controller 10 can assist the user in accessing another video clip.

In the method of FIG. 10, the guide and guide data transmitted in the audio signal are both recorded on the VCR tape during the transmission and then are played; however, the audio tones are muted from the television to avoid annoying the user. The following presents a simpler system, which eliminates the need to mute or record the audio tones. It is presumed that there is enough memory 28 in the guide controller 10 to store the entire guide for the relevant period, which can be one day, seven days or an entire month. In accordance with CDTL or compressed code programming of the VCR, the VCR 12 turns on to start recording just before the time of transmission, which is most likely at night. At the beginning of the transmission, a start of message audio tone is transmitted and detected by the guide controller 10 via the audio decoder 22. The guide controller then sends a stop command to stop recording to the VCR 12 through the serial port 50. The VCR stops recording while all of the audio tone data for the guide is transmitted, and during the guide transmission time the tones are passed through the VCR audio out port 20 to the guide controller 10, where they are decoded by audio decoder 22 and stored into RAM 28. At the end of the guide transmission, an end of message audio tone is transmitted which causes the guide controller 10 to send a record signal to the VCR 12 through the serial port 50. The VCR 12 then starts to record the video clip portion of the guide. During recording the audio decoder 22 determines whether an index command, such as index command 278, has been transmitted in the audio. If so, then an index mark command is sent to the VCR 12 to write a VISS mark, such as VISS mark 280 into the control track of the tape, as shown in FIG. 9.

Figure 11:
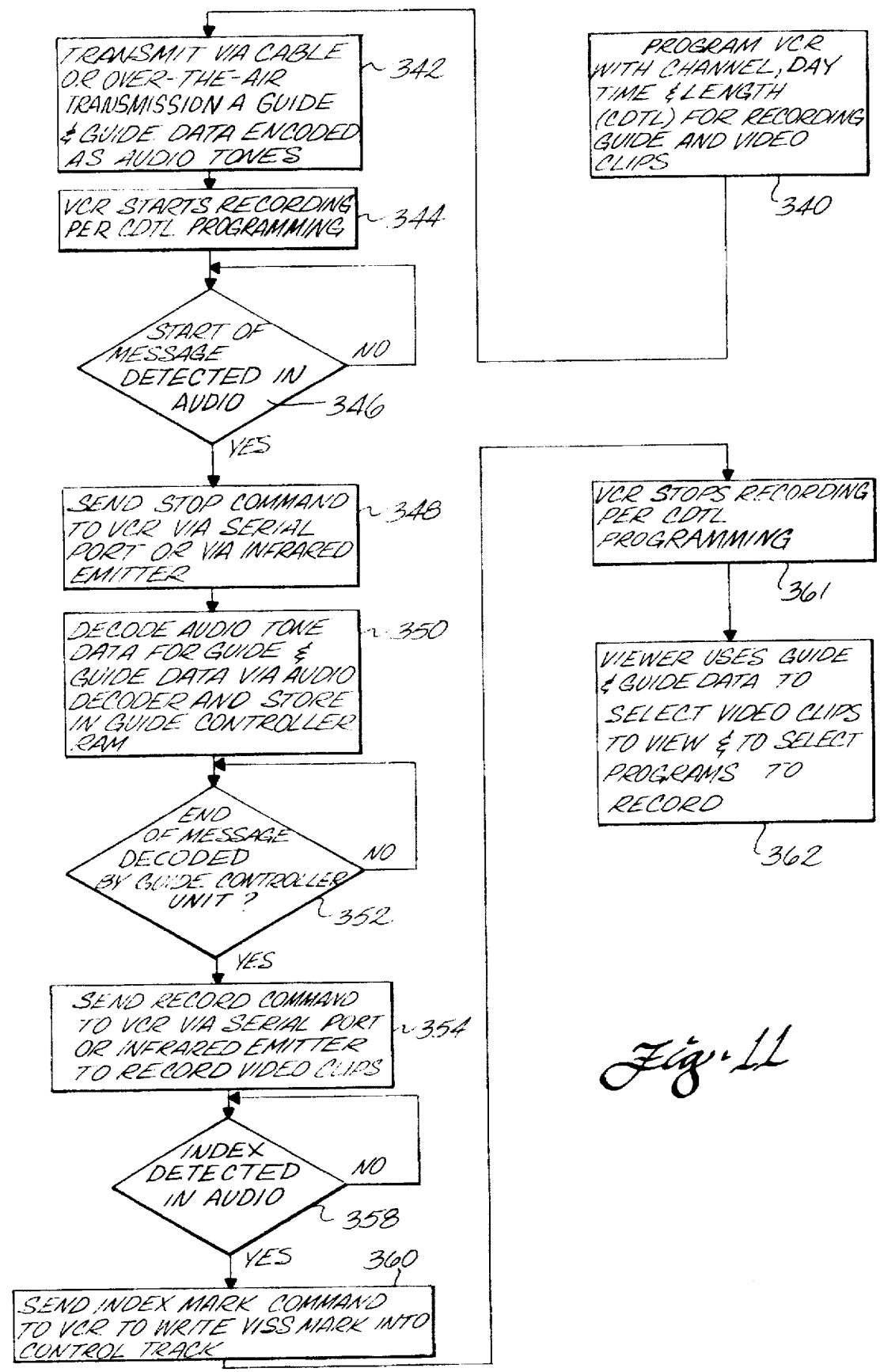
FIG. 11 is a another flow graph of steps for using the apparatus for a television guide transmitted in the audio according to the present invention.

FIG. 11 is a flow graph of steps for using the apparatus for a television guide transmitted in the audio according to the present invention. In step 340 the VCR is programmed with a channel, day, time-of-day, and length or compressed code for recording at the time of the transmission. Then in step 342 the guide and guide data encoded as audio tones are transmitted via cable or over the air transmission. In step 344 the VCR starts recording according to the programming in step 340. In step 346 it is determined whether a start of message audio tone has been detected. If a start of message audio tone is detected then in step 348 a stop command is sent to the VCR via serial port 50 or via infrared emitter 30 and IR detector 32 on the VCR. While the VCR is in a stop mode the VCR does not record. The guide and guide data are then transmitted and sent via audio output 20 to audio decoder 22 and then stored in guide controller RAM 28 as shown in step 350. In step 352 it is determined whether an end of message audio tone has been decoded by guide controller unit 10. If the end of message is decoded then in step 354 a record command is sent to the VCR via serial port 50 or via the infrared emitter 30 on the guide controller and the infrared detector 32 on the VCR. Now any video clips in the transmission are recorded. In step 358 it is determined whether any index audio tones are detected and if they are then in step 360 an index mark command is sent to the VCR to write a VISS mark into the control track. The index mark command can be sent via serial port 50 or via the infrared emitter 30 on the guide controller and the infrared detector 32 on the VCR.

Then in step 361 the VCR stops recording when the length of recording is the same as the length specified by the VCR programming in step 340. Then in step 362 the viewer can use the guide or guide data to select video clips to view or to select programs to record. The guide and guide data can be displayed as shown in guide display 380 in FIG. 12.

In another embodiment of the invention, the guide and guide data are transmitted in the vertical blanking intervals of a television signal rather than the audio signal. Before discussing the details of this embodiment, television signal vertical blanking interval lines are described.

Figure 13:
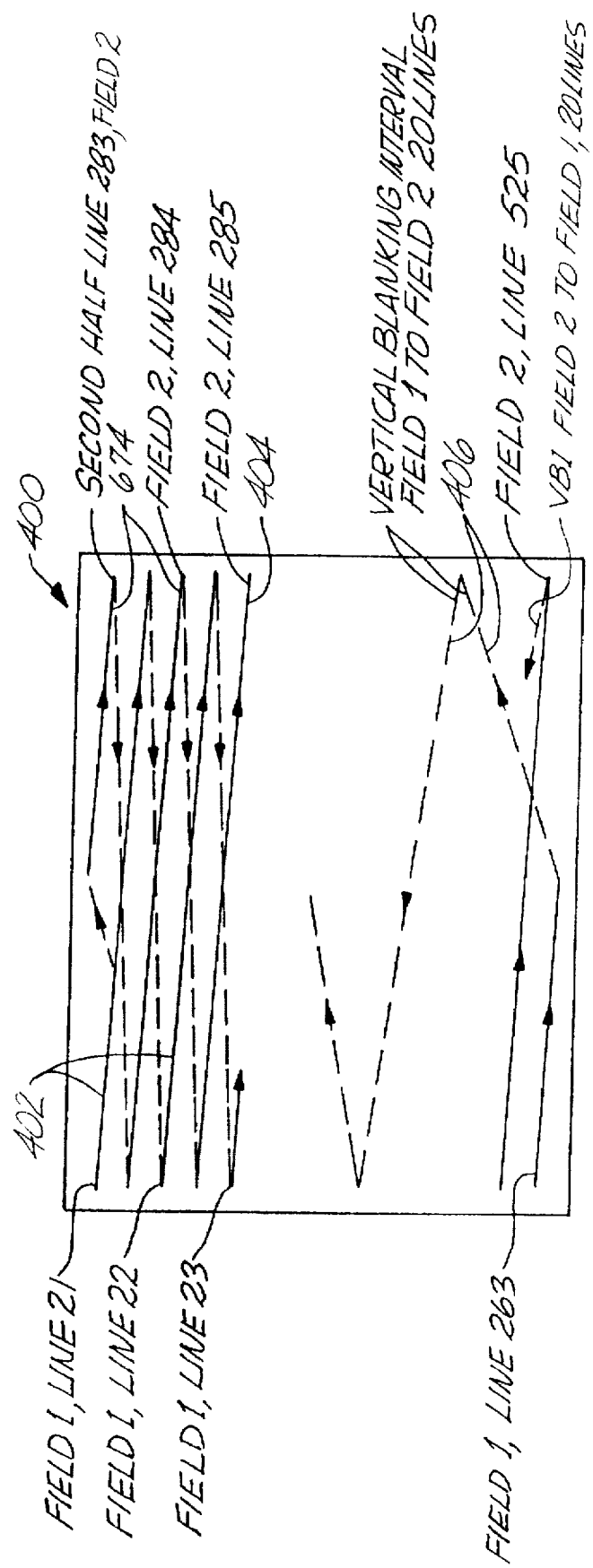
FIG. 13 is a diagram illustrating the fields, frames and vertical blanking interval of an interlaced television scanning raster.

FIG. 13 is a diagram illustrating the fields, frames and vertical blanking interval of an interlaced television scanning raster 400. The first field 402 of the television signal starts at the upper left corner of the screen and writes lines 21, 22, ... 263. At the bottom of the screen the beam writing the screen retraces in a series of lines back to the top of the screen. These lines are known as the vertical blanking interval lines 406. During the retrace the writing to the screen is blanked; however, because the signal is still present, additional information can be sent during the vertical blanking interval. There are at least 20 lines in the vertical blanking interval. After the vertical blanking interval, the second field 404 is written on the screen and lines 283, 284, ... 525 are interleaved between the lines of the first field 402. The two fields and the vertical blanking interval together constitute a frame.

Figure 14:
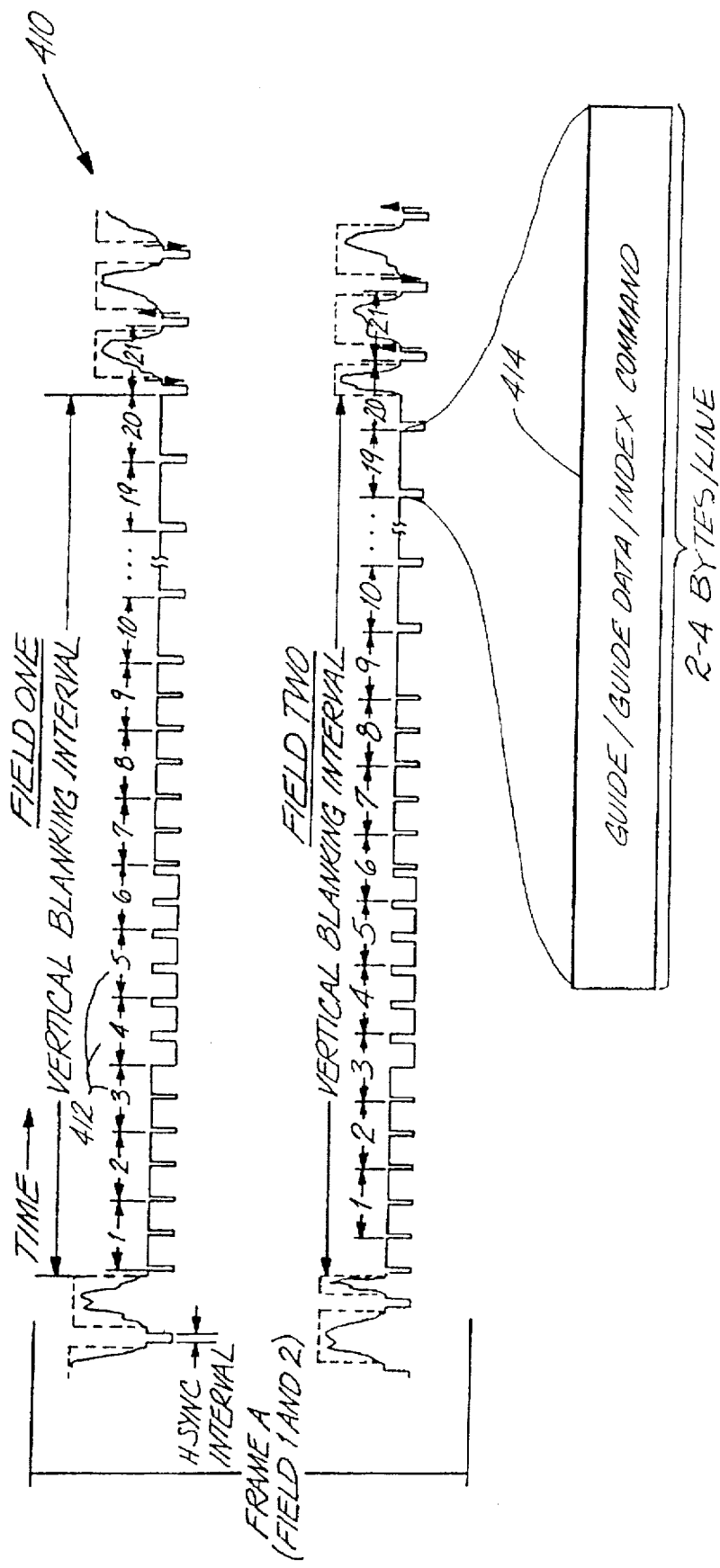
FIG. 14 is a diagram illustrating the timing of the vertical blanking interval (VBI) lines of an interlaced television scanning raster and the information that can be embedded in the VBI lines.

FIG. 14 is a diagram illustrating the timing 410 of the vertical blanking interval lines 1 to 20. As shown each vertical blanking interval line 412 occupies a portion of the time span. The vertical blanking interval can contain guide, guide data, and/or index commands 414, as shown. Each vertical blanking interval line can contain 2 to 4 bytes of information, so to transmit an entire guide, multiple fields and frames are required.

In this embodiment of the invention, the guide and guide data are transmitted in the vertical blanking interval lines of an over the air transmission. The guide controller 10 includes an RF switch 54 and a built in UHF loop or bow tie antenna 55. The cable input line 57 is routed from cable box 56 to the guide controller 10 and to the RF switch 54. The RF switch 54 is controlled via microprocessor 24 and guide controller 10 or via serial port 50 in VCR 12. The RF switch can select between the UHF antenna 55 or the cable input line 57 and send the selected signal via line 58 to the tuner 49 connected to the RF input of VCR 12. In this embodiment the signal source 11 of FIG. 1A is disconnected.

To receive the guide the user programs the VCR to record the guide at the designated time and channel on a periodic basis. When programming the VCR, the user enters a designation or indication that this particular program is a television guide. The guide is transmitted on a particular UHF channel generally at night for a duration of 0.5 to 2 hours.

Figure 15:
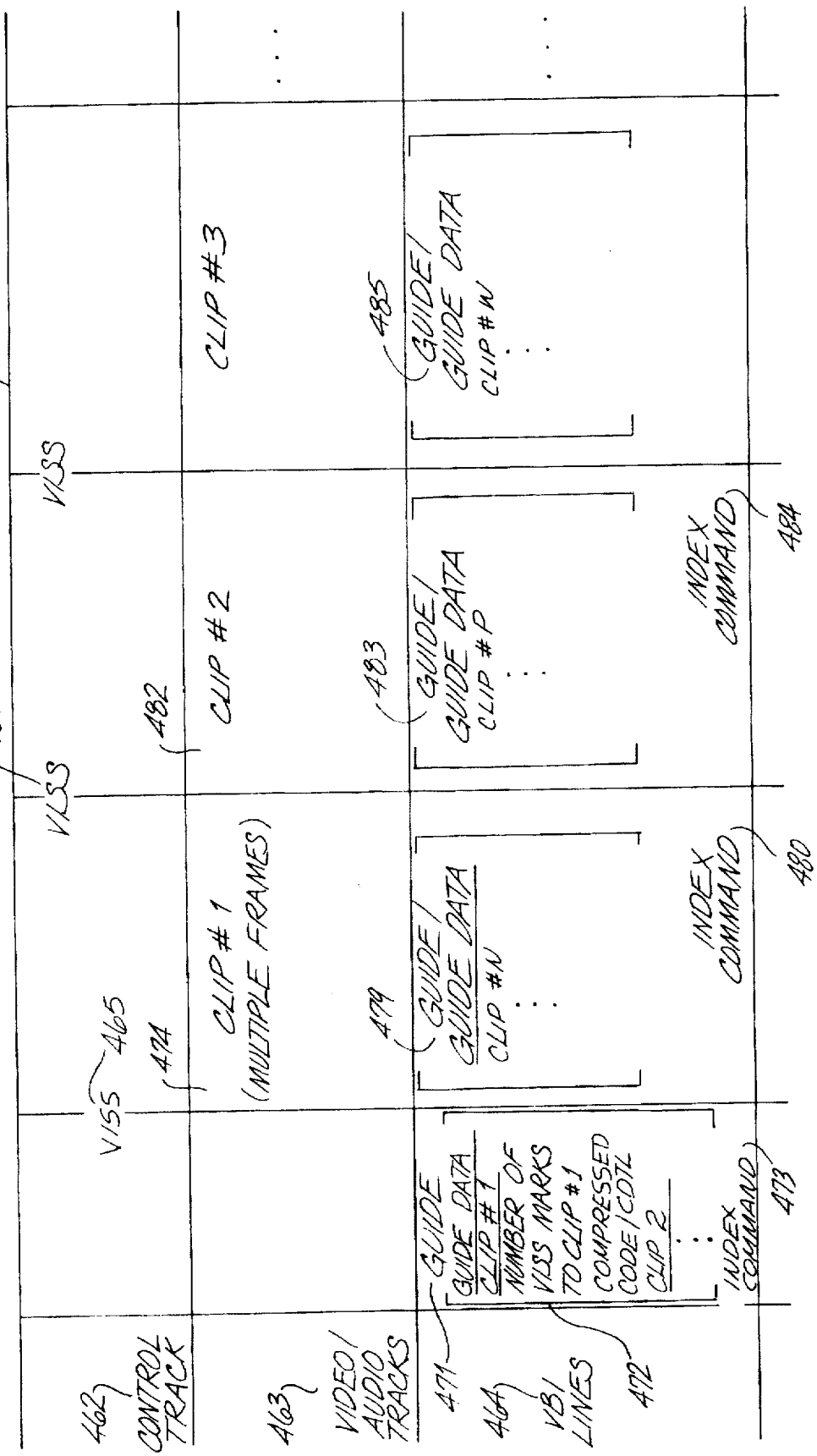
FIG. 15 is a drawing of a tape layout having a guide in the vertical blanking lines according to the present invention.

At the appropriate time according to the programming, the VCR is placed in a record mode and a signal is sent via the serial port 50 to the guide controller unit 10 to indicate that a television guide is now being transmitted. The VCR tuner 49 is also tuned to the designated UHF channel. The signal sent via the serial port to the guide controller unit 10 is used to switch RF switch 54 to the UHF antenna 55. Thus, the over-the-air transmission is received via the UHF antenna 55. The guide portion of the transmission is transmitted in the vertical blanking interval lines which are decoded by the VBI decoder 74 in the VCR 12, and sent out the serial port 50 to be stored in the guide controller RAM 28, any video clips can be simultaneously transmitted in the video and audio portions of the transmission signal and recorded by the VCR. After the completion of the transmission the VCR 12 causes the guide controller 10 to switch the signal on line 58 to the cable line 57 and the VCR tuner channel is returned to the cable base band channel, for example, channel 3. After recording, the tape appears as shown in FIG. 15.

The vertical blanking interval lines 464 contain guide 471, guide data 472 and an index command 473. The index command 473 is placed just before the start of the first video clip. When index command 473 is decoded by VBI decoder 74 during the transmission, then the VCR 12 is commanded to write an index mark or VISS mark 465 into the control track 462. The guide and guide data are spread throughout the transmission and can be embedded in the video clips, as shown by guide and guide data 479 which are transmitted at the same time that video clip 1 designated as 474 is transmitted. At the end of each video clip such as video clip 474 and just before the next video clip, there is an index command such as index command 480 in FIG. 15. When index command 480 is decoded by VBI decoder 74 during the transmission, then the VCR 12 is commanded to write an index mark or VISS mark 467 into the control track 462.

Figure 16:
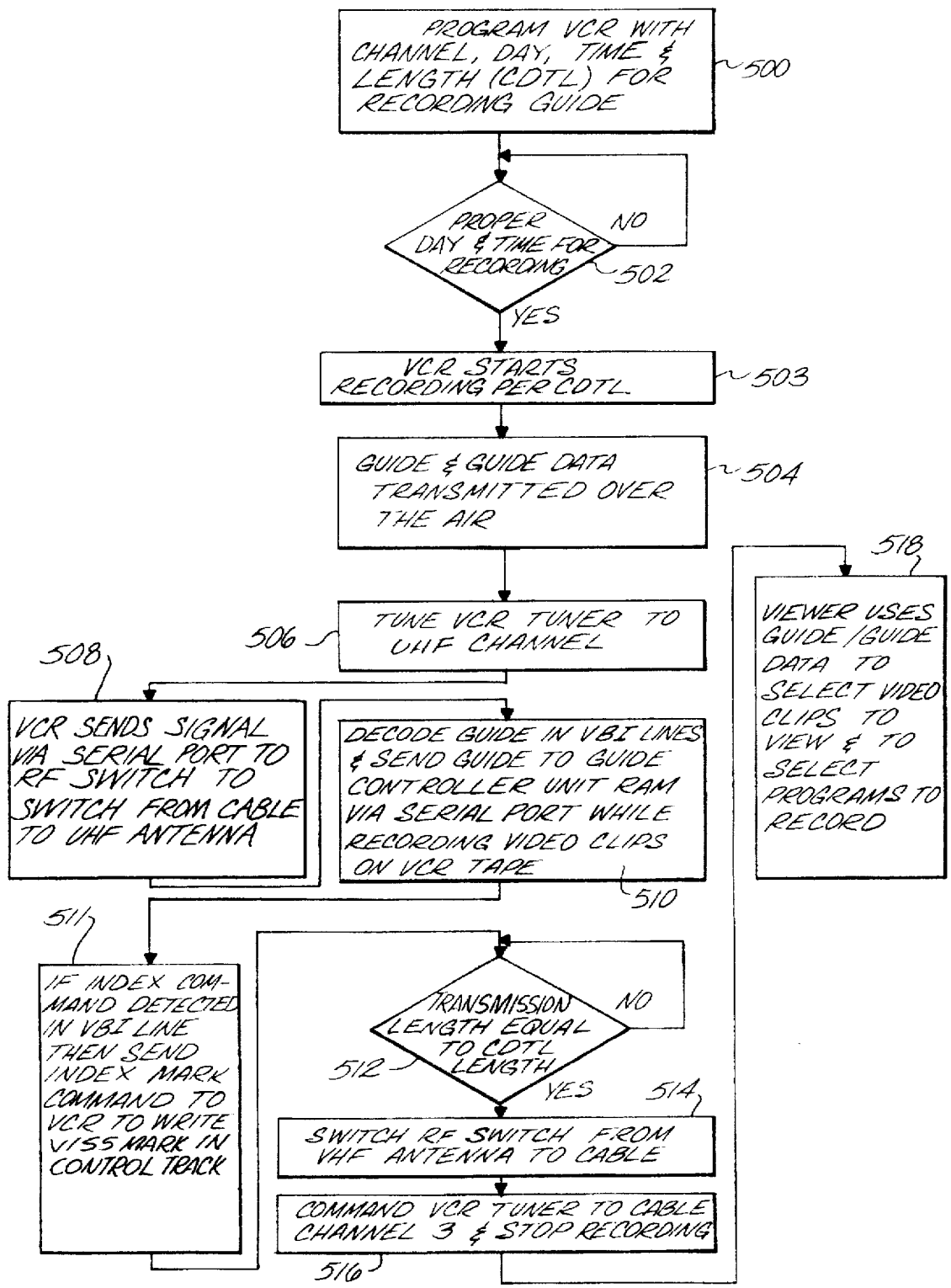
FIG. 16 is a flow graph of steps for using the apparatus for a television guide transmitted in the vertical blanking intervals lines according to the present invention.

FIG. 16 is a flow chart of the steps of the method for this embodiment. In step 500 the VCR is programmed with a channel, day, time-of-day, and length or a compressed code for recording the television guide. In step 502 it is determined whether the proper time has arrived for recording the guide. If the proper time has arrived then in step 503 the VCR starts to record the guide which is transmitted over the air on the designated channel in step 504. In step 506 the VCR tuner 49 is tuned to the UHF channel upon which the guide will be transmitted. In step 508 the VCR sends a signal via serial port 50 to RF switch 54 to switch from cable line 57 from cable box 56 to UHF antenna 55. In step 510 VBI decoder 74 in VCR 12 decodes the guide in the VBI lines and sends the guide to guide controller unit RAM 28 via serial port 50. While the guide is being decoded and stored any video clips being transmitted can be recorded on the VCR. During recording on the VCR if any index commands are detected in the VBI lines by the VBI decoder 74 and sent to microprocessor 24 in guide controller 10, then an index mark command is sent from guide controller unit 10 to VCR 12 via serial port 50 or via infrared emitter 30 and infrared detector 32 to command the VCR to write a VISS mark in the control track 462, as shown in FIG. 15. In step 512 it is determined whether the length of the transmission and the recording is equal to the length set in the programming of the VCR in step 500. If the length of the recording of the transmission is equal to the CDTL length then in step 514 the RF switch 54 is switched from UHF channel 55 to cable line 57, and in step 516 the VCR tuner is commanded to the cable base band channel, for example, channel 3 and the VCR is commanded to stop recording. Then in step 518 the viewer can use the guide and guide data to select video clips to view and to select programs to record.

Thus, there has been described apparatus and methods for a television guide. The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed:

1. An apparatus for a television guide, the apparatus comprising:

a video cassette recorder having a television output and an audio output;

means for decoding audio signals coupled to the audio output;

means for commanding the video cassette recorder to mute audio signals on the television output in response to a first audio signal from the audio output decoded by the means for decoding audio signals;

means for decoding a television guide from audio signals on the audio output by the means for decoding audio signals; and means for storing the television guide.

2. The apparatus of claim 1 further comprising means for commanding the video cassette recorder to turn on audio signals on the television output in response to a second audio signal from the audio output decoded by the means for decoding audio signals.

3. An apparatus for a television guide, the apparatus comprising:

a video cassette recorder having an audio output;

means for decoding audio signals coupled to the audio output;

means for commanding the video cassette recorder to stop recording in response to a first audio signal from the audio output decoded by the means for decoding audio signals;

means for decoding a television guide from audio signals on the audio output by the means for decoding audio signals; and means for storing the television guide.

4. The apparatus of claim 3 further comprising means for commanding the video cassette recorder to start recording in response to a second audio signal from the audio output decoded by the means for decoding audio signals.

5. The apparatus of claim 3 or 4 further comprising means for commanding the video cassette recorder to record an index mark in response to a third audio signal decoded by the means for decoding audio signals.

6. The apparatus of claim 5 further comprising: a clock having an output as a function of time coupled to the video cassette recorder;

means for entering and storing a channel, time-of-day and length for a program to be recorded by the video cassette recorder;

means for comparing the clock output with the time-of-day;

means for commanding the video cassette recorder to start recording the channel when the clock output compares with the time-of-day; and means for commanding the video cassette recorder to stop recording the channel when the clock output minus the time-of-day compares with the length.

7. The apparatus of claim 6 wherein the means for entering and storing a channel, time-of-day and length for a program to be recorded by the video cassette recorder comprises:

means for entering compressed codes each having at least one digit and each representative of, and compressed in length from, the combination of the channel, time-of-day, and length; and means for decoding a compressed code having at least one digit into channel, time-of-day, and length.

8. The apparatus of claim 7 wherein the video cassette recorder further comprises a serial input means coupled to the means for decoding audio signals for sending commands to the video cassette recorder.

9. An apparatus for a television guide, the apparatus comprising:

a video cassette recorder having a signal input line and a clock having an output as a function of time;

means for entering and storing a channel, time-of-day and length for a program to be recorded by the video cassette recorder;

means for comparing the clock output with the time-of-day;

means for commanding the video cassette recorder to start recording the channel when the clock output compares with the time-of-day;

means for switching the signal input line between a first signal source and a second signal source;

means for commanding the means for switching to switch to the first signal source when the clock output compares with the time-of-day;

means for decoding a television guide from television signals on the signal input line; and means for storing the television guide.

10. The apparatus of claim 9 further comprising:

means for commanding the video cassette recorder to stop recording the channel when the clock output minus the time-of-day compares with the length; and means for commanding the means for switching to switch from the first signal source to the second signal source when the clock output minus the time-of-day compares with the length.

11. The apparatus of claim 10 wherein the means for decoding a television guide from television signals on the signal input line comprises a vertical blanking interval decoder.

12. The apparatus of claim 11 wherein the means for switching the signal input line between a first signal source and a second signal source comprises:

a switch; and a control coupled from the video cassette recorder to the switch for controlling the switch.

13. The apparatus of claim 12 wherein the means for entering and storing a channel, time-of-day and length for a program to be recorded by the video cassette recorder comprises:

means for entering compressed codes each having at least one digit and each representative of, and compressed in length from, the combination of the channel, time-of-day, and length; and means for decoding a compressed code having at least one digit into channel, time-of-day, and length.

14. A method for providing a television guide comprising the steps of:

transmitting a television guide encoded as audio tones;

recording the transmitted television guide on a tape installed in a video cassette recorder having a television output and an audio output;

playing the recorded tape;

decoding audio signals from the audio output;

commanding the video cassette recorder to mute audio signals on the television output in response to a first audio signal decoded from the audio output; and storing the television guide decoded from audio signals from the audio output.

15. The method of claim 14 further comprising commanding the video cassette recorder to turn on audio signals on the television output in response to a second audio signal decoded from the audio output.

16. The method of claim 14 wherein the step of recording the transmitted television guide on a video cassette recorder tape further comprises the steps of:

providing a clock having an output as a function of time coupled to the video cassette recorder;

entering and storing a channel, time-of-day and length for a program to be recorded by the video cassette recorder;

comparing the clock output with the time-of-day;

commanding the video cassette recorder to start recording the channel when the clock output compares with the time-of-day; and commanding the video cassette recorder to stop recording the channel when the clock output minus the time-of-day compares with the length.

17. A method for providing a television guide comprising the steps of:

transmitting a television guide encoded as audio tones;

starting to record the transmitted television guide on a video cassette recorder tape;

decoding audio signals from an audio output on the video cassette recorder;

commanding the video cassette recorder to stop recording in response to a first audio signal decoded from the audio output; and storing a television guide decoded from audio signals from the audio output in a memory while the video cassette recorder is stopped.

18. The method of claim 17 further comprising the step of commanding the video cassette recorder to start recording in response to a second audio signal decoded from the audio output.

19. The method of claim 16 or 18 further comprising the step of commanding the video cassette recorder to record an index mark in response to a third audio signal decoded from the audio output.

20. The method of claim 17 wherein the step of starting to record the transmitted television guide on a video cassette recorder tape comprises the steps of:

providing a clock having an output as a function of time coupled to the video cassette recorder;

entering and storing a channel, time-of-day and length for a program to be recorded by the video cassette recorder;

comparing the clock output with the time-of-day; and commanding the video cassette recorder to start recording the channel when the clock output compares with the time-of-day.

21. The method of claim 20 wherein the step of commanding the video cassette recorder to start recording in response to a second audio signal decoded from the audio output comprises the steps of:

commanding the video cassette recorder to stop recording the channel when the clock output minus the time-of-day compares with the length.

22. The method of claim 16 or 20 wherein the step of entering and storing a channel, time-of-day and length for a program to be recorded by the video cassette recorder comprises the steps of:

entering compressed codes each having at least one digit and each representative of, and compressed in length from, the combination of the channel, time-of-day, and length; and decoding a compressed code having at least one digit into channel, time-of-day, and length.

* * * * *